United States Patent [19]

Fu et al.

[11] Patent Number: 5,703,965

[45] Date of Patent: Dec. 30, 1997

[54] IMAGE COMPRESSION/DECOMPRESSION BASED ON MATHEMATICAL TRANSFORM, REDUCTION/EXPANSION, AND IMAGE SHARPENING

[75] Inventors: Chi-Yung Fu, San Francisco; Loren I. Petrich, Livermore, both of Calif.

[73] Assignee: The Regents of the University of California, Oakland, Calif.

[21] Appl. No.: 486,172

[22] Filed: Jun. 6, 1995

Related U.S. Application Data

[63] Continuation-in-part of Ser. No. 348,431, Dec. 2, 1994, Pat. No. 5,615,287, and Ser. No. 441,152, May 15, 1995, Ser. No. 894,391, Jun. 5, 1992, Pat. No. 5,538,915.

[51] Int. Cl.[6] .................. G06K 9/36; G06K 9/46
[52] U.S. Cl. .................. 382/232; 382/266; 382/299; 382/300
[58] Field of Search .................. 382/232, 242, 382/250, 166, 199, 266, 267, 268, 269, 263, 264, 299, 300

[56] References Cited

U.S. PATENT DOCUMENTS

| | | | |
|---|---|---|---|
| 4,718,104 | 1/1988 | Anderson | 382/240 |
| 4,776,029 | 10/1988 | Shimura | 382/251 |
| 4,817,174 | 3/1989 | Nakatani | 382/266 |
| 4,829,378 | 5/1989 | LeGall | 382/248 |
| 5,422,964 | 6/1995 | Devimeux et al. | 382/266 |
| 5,491,761 | 2/1996 | Kim | 382/254 |

OTHER PUBLICATIONS

Yang et al., "Regularized reconstruction to reduce blocking artifacts of block discrete costume transform compressed images" IEEE Trans. Circuits Syst. Video Technol., vol. 3, No. 6, pp. 421–432, Dec. 1993.

*Primary Examiner*—Leo Boudreau
*Assistant Examiner*—Phuoc Tran
*Attorney, Agent, or Firm*—Henry P. Sartorio; Richard B. Main

[57] ABSTRACT

An image represented in a first image array of pixels is first decimated in two dimensions before being compressed by a predefined compression algorithm such as JPEG. Another possible predefined compression algorithm can involve a wavelet technique. The compressed, reduced image is then transmitted over the limited bandwidth transmission medium, and the transmitted image is decompressed using an algorithm which is an inverse of the predefined compression algorithm (such as reverse JPEG). The decompressed, reduced image is then interpolated back to its original array size. Edges (contours) in the image are then sharpened to enhance the perceptual quality of the reconstructed image. Specific sharpening techniques are described.

8 Claims, 16 Drawing Sheets

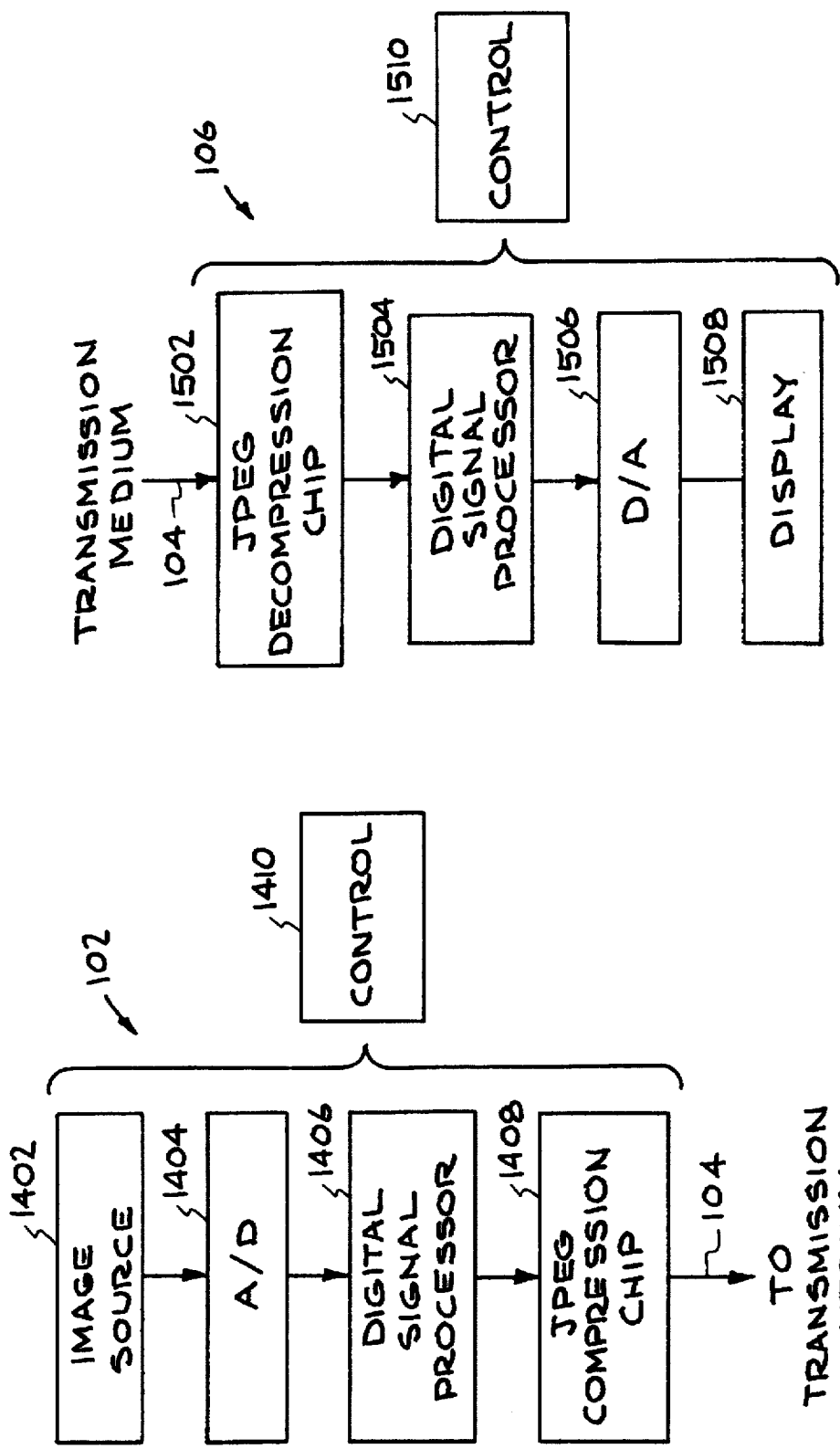

IMAGE COMPRESSION/DECOMPRESSION BASED ON MATHEMATICAL TRANSFORM, REDUCTION/EXPANSION, AND IMAGE SHARPENING

CONTINUING APPLICATION DATA

This application is a continuation-in-part of U.S. patent application Ser. No. 08/348,431, filed Dec. 2, 1994, now U.S. Pat. No. 5,615,287, entitled IMAGE COMPRESSION TECHNIQUE (Docket No. IL-9464), inventors Chi-Yung Fu and Loren I. Petrich, assigned to the assignee of the present invention, and hereby incorporated by reference, and a continuation-in-part of U.S. patent application Ser. No. 08/441,152, filed May 15, 1995, entitled SELECTIVE DOCUMENT IMAGE DATA COMPRESSION TECHNIQUE (Docket No. IL-9511), inventors Chi-Yung Fu and Loren I. Petrich, hereby incorporated by reference, and a continuation-in-part of U.S. patent application Ser. No. 07/894,391, filed Jun. 5, 1992, now U.S. Pat. No. 5,538,915, entitled PROCESS FOR FORMING SYNAPSES IN NEURAL NETWORKS AND RESISTOR THEREFOR (Docket No. IL-8668), inventor Chi-Yung Fu, assigned to the assignee of the present invention, and hereby incorporated by reference.

The United States Government has rights in this invention pursuant to Contract No. W-7405-ENG-48 between the U.S. Department of Energy and the University of California, for the operation of Lawrence Livermore National Laboratories.

BACKGROUND

1. Field of the Invention

The invention relates to still and moving image compression techniques.

2. Description of Related Art

Digitized images require a notoriously large amount of storage space to store and a notoriously large amount of bandwidth to transmit. A single, relatively modest-sized image, having 480 by 640 pixels and a full-color resolution of 24 bits per pixel (three 8-bit bytes per pixel), occupies nearly a megabyte of data. At a resolution of 1024 by 768 pixels, a 24-bit color screen requires 2.3 megabytes of memory to represent. A 24-bit color picture of an 8.5 inch by 11 inch page, at 300 dots per inch, requires as much as 25 megabytes to represent.

Video images are even more data-intensive, since it is generally accepted that for high-quality consumer applications, images must occur at a rate of at least 30 frames per second. Current proposals for high-definition television (HDTV) call for as many as 1920 by 1035 or more pixels per frame, which translates to a data transmission rate of about 1.5 billion bits per second. This bandwidth requirement can be reduced somewhat if one uses 2:1 interleaving and 4:1 decimation for the U and V chromonance components, but 0.373 billion bits per second are still required.

Traditional lossless techniques for compressing digital image and video information, such as Huffman encoding, run length encoding and the Lempel-Ziv-Welch algorithm, are far from adequate to meet this demand. For this reason, compression techniques which can involve some loss of information have been devised, including discrete cosine transform (DCT) techniques, adaptive DCT (ADCT) techniques, and wavelet transform techniques. Wavelet techniques are discussed in DeVore, Jawerth and Lucier, "Image Compression Through Wavelet Transform Coding", IEEE Transactions on Information Theory, Vol. 38, No. 2, pp. 719-746 (1992); and in Antonini, Barlaud, Mathieu and Daubechies, "Image Coding Using Wavelet Transform", IEEE Transactions on Image Processing, Vol. 1, No. 2, pp. 205-220 (1992), both incorporated by reference herein.

The Joint Photographic Experts Group (JPEG) has promulgated a standard for still image compression, known as the JPEG standard, which involves a DCT-based algorithm. The JPEG standard is described in a number of publications, including the following incorporated by reference herein: Wallace, "The JPEG Still Picture Compression Standard", IEEE Transactions on Consumer Electronics, Vol. 38, No. 1, pp. xviii-xxxiv (1992); Purcell, "The C-Cube CL550 JPEG Image Compression Processor", C-Cube Microsystems, Inc. (1992); and C-Cube Microsystems, "JPEG Algorithm Overview" (1992).

An encoder using the JPEG algorithm has four steps: linear transformation, quantization, run-length encoding (RLE), and Huffman coding. The decoder reverses these steps to reconstitute the image. For the linear transformation step, the image is divided up into 8*8 pixel blocks and a Discrete Cosine Transform is applied in both spatial dimensions for each block. The purpose of dividing the image into blocks is to overcome a deficiency of the DCT algorithm, which is that the DCT is seriously nonlocal. The image is divided into blocks in order to overcome this nonlocality by confining it to small regions, and doing separate transforms for each block. However, this compromise has a disadvantage of producing a tiled appearance (blockiness) upon high compression.

The quantization step is essential to reduce the amount of information to be transmitted, though it does cause loss of image information. Each transform component is quantized using a value selected from its position in each 8*8 block. This step has the convenient side effect of reducing the abundant small values to zero or other small numbers, which can require much less information to specify.

The run-length encoding step codes runs of same values, such as zeros, in items identifying the number of times to repeat a value, and the value to repeat. A single item like "8 zeros" requires less space to represent than a string of 8 zeros, for example. This step is justified by the abundance of zeros that usually result from the quantization step.

Huffman coding translates each symbol from the run-length encoding step into a variable-length bit string that is chosen depending on how frequently the symbol occurs. That is, frequent symbols are coded with shorter codes than infrequent symbols. The coding can be done either from a preset table or one composed specifically for the image to minimize the total number of bits needed.

Similarly to JPEG, the Motion Pictures Experts Group (MPEG) has promulgated two standards for coding image sequences. The standards are known as MPEG I and MPEG II. The MPEG algorithms exploit the common fact of relatively small variations from frame to frame. In the MPEG standards, a full image is compressed and transmitted only once for every 12 frames. The JPEG standard is typically used to compress these "reference" or "intra" frames. For the intermediate frames, a predicted frame is calculated and only the difference between the actual frame and the predicted frame is compressed and transmitted. Any of several algorithms can be used to calculate a predicted frame, and the algorithm is chosen on a block-by-block basis depending on which predictor algorithm works best for the particular block. Motion detection can be used in some of the predictor algorithms. MPEG I is described in detail in International Standards Organization (ISO) CD 11172, incorporated by reference herein in its entirety.

Accordingly, for compression of video sequences, the MPEG technique is one which treats the compression of reference frames substantially independently from the compression of intermediate frames between reference frames. The present invention relates primarily to the compression of still images and reference frames for video information, although aspects of the invention can be used to accomplish video compression even without treating reference frames and intermediate frames independently.

The JPEG standard achieves still image compression ratios of about 10:1 to 20:1 or more, depending on the image and the user's standard for acceptable quality. While this is better than the compression ratios of standard lossless techniques, it is still inadequate considering the huge numbers of still and moving images which are likely to require storage and transmission in the near future. Wavelet-based compression techniques generally achieve compression ratios which are better than those achieved by DCT-based techniques such as JPEG, but they are still inadequate.

Other techniques exist for compressing still images, involving the separation of, and separate coding of, different types of information from the original image. These separate codings allow the coding techniques to be optimized for the type of information. In Ran and Farvardin, "Adaptive DCT Image Coding Based on a Three-Component Image Model", 1992 IEEE International Conference on Acoustics, Speech and Signal Processing, Vol. 3, pp. 201–204 (1992), incorporated herein by reference, there is described a three-component technique in which what is referred to as "strong edge" information from a still image is encoded separately from the sum of a smooth portion of the image and a textured portion of the image.

The above techniques for compressing digitized images represent only a few of the techniques that have been devised. However, none of the known techniques yet achieve compression ratios sufficient to support the huge still and video data storage and transmission requirements expected in the near future. The techniques also raise additional problems, apart from pure compression ratio issues. In particular, for real time, high-quality video image decompression, the decompression algorithm must be simple enough to be able to produce 30 frames of decompressed images per second. The speed requirement for compression is often not as extreme as for decompression, since for many purposes, images can be compressed in advance. Even then, however, compression time must be reasonable to achieve commercial objectives. In addition, many applications require real time compression as well as decompression, such as real time transmission of live events. Known image compression and decompression techniques which achieve high compression ratios, often do so only at the expense of requiring extensive computations either on compression or decompression, or both.

Still another restriction on improved image compression techniques is a commercial restriction. Of all the above compression techniques, JPEG (and its motion picture extension, MPEG) has become the one most accepted for the transmission of real-time images over limited bandwidth communication media, and a number of companies have even developed integrated circuit chips and chipsets specifically for JPEG-based and MPEG-based compression and decompression of images. Despite the inadequacies of JPEG and MPEG, therefore, the commercial trend toward JPEG and MPEG as image compression standards is restricting the ability of any substitute technique from gaining market acceptance. Therefore, it is an object of the present invention to improve upon the existing JPEG and MPEG image compression technique without replacing it entirely with a different techniques. Preferably the improved technique will be able to utilize existing JPEG and MPEG chips and chipsets and still achieve significantly higher compression ratios without sacrificing quality, and without imposing a significantly increased requirement for extensive computations.

SUMMARY OF THE INVENTION

The techniques described herein for compressing and decompressing an image permit significantly improved compression ratios without loss of perceptual quality in the reconstructed image as compared to conventional image compression/reconstruction techniques, and individual steps can be performed more quickly due to their simplicity relative to conventional techniques. The invention can be implemented in part using commercially available JPEG compression/decompression chips, although different embodiments can replace the JPEG technique entirely.

According to the invention, roughly described, an image represented in a first image array of pixels is first decimated in two dimensions before being compressed by a predefined compression algorithm such as JPEG. Another possible predefined compression algorithm can involve a wavelet technique. The compressed, reduced image is then transmitted over the limited bandwidth transmission medium, and the transmitted image is decompressed using an algorithm which is an inverse of the predefined compression algorithm (such as reverse JPEG). The decompressed, reduced image is then interpolated back to its original array size. Edges (contours) in the image are then sharpened to enhance the perceptual quality of the reconstructed image.

In one embodiment, if the original image array has N1 elements in a first dimension and N2 elements in a second dimension, the decimation process involves determining a respective value for each element of the decimated image array such that the sum of the squares of the differences between each element of the original image array and each corresponding element of a hypothetical array constructed by interpolating the decimated image array by the interpolation function which later will be used to expand the decompressed, reduced image after transmission, would be minimized.

In an aspect of the invention, the sharpening step on image reconstruction can be performed by calculating a modified pixel value $\vec{I}_j^{mod}$ for each i'th previous pixel value according to a function of the form $$\vec{I}_j^{mod} = w(\Delta \vec{x}_j, \Delta \vec{I}_j)$$

where $\vec{x}_j$ is the two-dimensional position in the image array of the j'th pixel; $\vec{I}_j$ is the previous three-color value of the j'th pixel; and $\vec{I}_j^{mod}$ is the modified three-color value of the j'th pixel, for any j'th pixel in the image array. The weight function w is chosen such that it decreases as the absolute value of $\Delta \vec{x}$ and the absolute value of $\Delta \vec{I}$ increase.

In another embodiment, an edge file is created from the original image array, and transmitted to the destination in conjunction with the compressed, reduced image data. The sharpening step then involves enhancing the edges of the expanded, reconstructed image array based on the contours as indicated by the edge file. Optionally, where JPEG or another block-oriented algorithm is used as the predefined compression algorithm, the borders of the blocks are smoothed as well in the sharpening step. The position in the expanded, reconstructed image array of the compression block borders need not be transmitted by the originating system, since they are defined by the compression algorithm standard and are easily calculated by the receiving system.

The invention can be implemented in part using commercially available JPEG compression/decompression chips. An embodiment of the invention can also use fast analog multiply-and-add chips made in accordance with the invention of the above-incorporated PROCESS FOR FORMING SYNAPSES IN NEURAL NETWORKS AND RESISTOR THEREFOR (Ser. No. 894,391) patent application.

The high compression ratios achievable with the invention permit the transmission of images and video over narrower bandwidth channels. For transmissions using allocated electromagnetic spectrum space, the ability to use a narrower bandwidth permits a shift from higher frequency carriers to lower frequency carriers. This reduces the cost of transmission since bandwidth tends to be more expensive for higher frequency carriers than for lower frequency carriers.

The invention can be used in many commercial applications, including but not limited to teleconferencing, multimedia, HDTV, virtual reality, bankcheck compression, documentation compression, facsimile transmission, networking, internet communications and storage, communications and storage on the information highway, videophones, battlefield simulation, graphical simulation, information visualization such as scientific visualization from scientific models, cartoons, medical records such as X-ray images, CT scans, MRIs, PET scans, as well as any other application that can benefit from compression.

Other features, advantages and aspects of the invention will become apparent upon a reading of the remainder of the specification and claims hereof.

BRIEF DESCRIPTION OF THE DRAWINGS

The invention will be described with respect to particular embodiments thereof, and reference will be made to the drawings, in which:

FIGS. 14 and 16 are block diagrams of respective hardware embodiments of source systems according to the invention;

FIGS. 15 and 17 are block diagrams of respective hardware embodiments of destination systems according to the invention;

DETAILED DESCRIPTION

Figure 1:
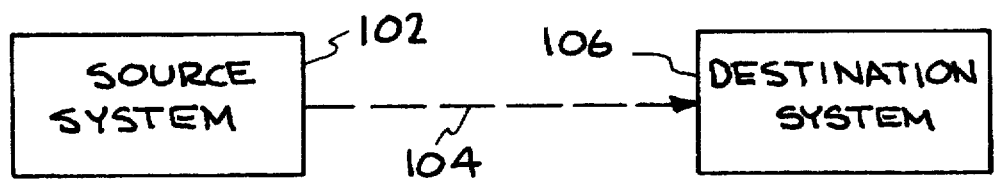
FIG. 1 is an overall block diagram illustrating apparatus incorporating the invention.

FIG. 1 is an overall block diagram illustrating apparatus incorporating the invention. It comprises a source system 102, a transmission medium 104, and a destination system 106. The source and destination systems can be computer systems or dedicated hardware units, and the transmission medium 104 can include parts of a cable television network, computer network, radio link, satellite link, data storage medium (such as a floppy disk or CD-ROM) which is hand carried from the source system 102 to the destination system 106, or any other medium by which information can be transmitted from a source to a destination. Additionally, although not illustrated in FIG. 1, the invention can be implemented in the manner in which the source and destination are two separately executing processes running on a single computer system, either concurrently or separated in time; in this case the transmission medium 104 might include local volatile memory, a local cache memory, a local bus, and/or a local or network mass storage device. A common feature of all transmission mediums 104 is that their capacity for carrying image information is inherently limited. It is this characteristic of transmission media which renders image compression techniques important.

Figure 2:
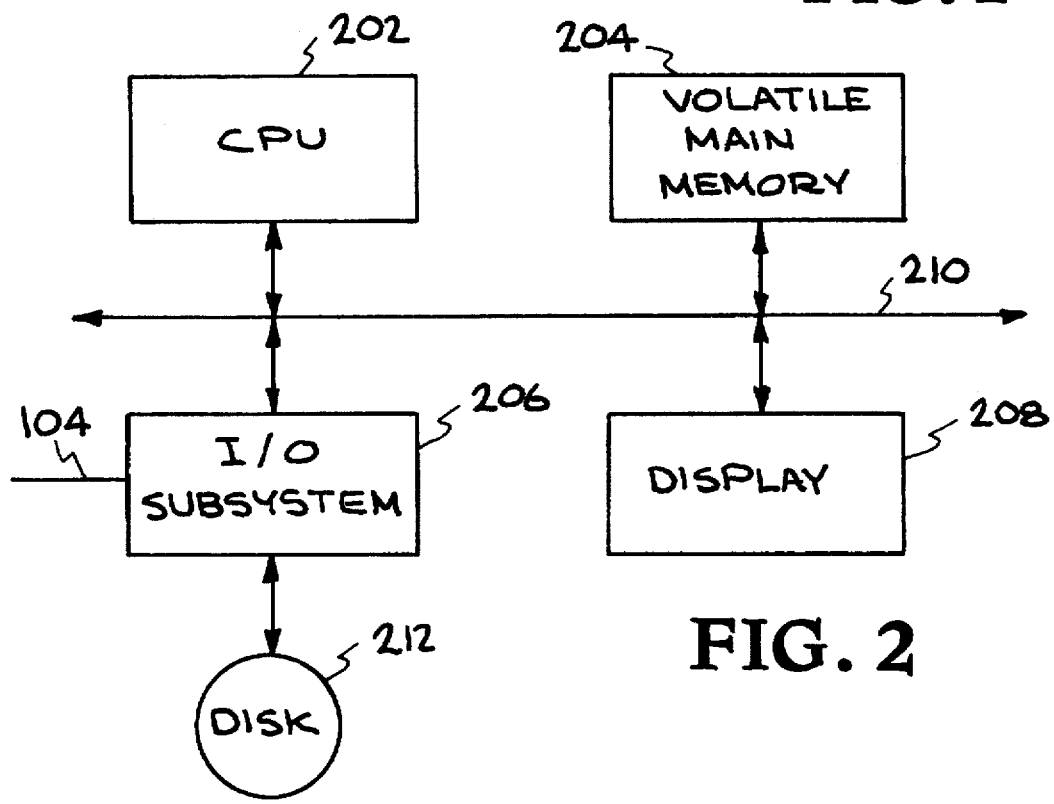
FIG. 2 illustrates a typical hardware computer system platform which in one embodiment executes software for implementing the invention.

Although the invention can be implemented in a manner which uses commercially available JPEG chips, FIG. 2 illustrates a possible hardware platform, in this case a computer system platform, which in one embodiment executes software for implementing the invention. The computer system of FIG. 2 comprises a CPU 202, main memory 204, which may be volatile, an I/O subsystem 206, and a display 208, all coupled to a CPU bus 210. The I/O subsystem 206 communicates with peripheral devices such as a disk drive 212. In operation, a computer program implementing aspects of the invention is retrieved from the disk 212 into main memory 204 for execution by the CPU 202. If the system of FIG. 2 represents a source system 102 (FIG. 1), then one or more source images can be located on the disk drive 212 or provided by an external source (not shown). These images are retrieved by the CPU 202, running under the control of the computer program. The CPU operating under the control of the computer program processes the images in the manner set forth herein, and either stores them back on disk 212 or transmits them over the transmission medium 104 (FIG. 1) to the destination system. If the computer system of FIG. 2 represents the destination system 106 (FIG. 1), then it receives the compressed image or images over the transmission medium 104, and in accordance with a decompression computer program which the CPU 202 retrieved from the disk 212, decompresses them and outputs them either back to the disk 212, or to the display 208, or to some other device (not shown).

It is worthwhile noting that the invention concerns manipulation of physical signals representing color or luminance values, not merely manipulation of the abstract values themselves, although the reasons for manipulating the physical signals in the manner herein described derive from the mathematical manipulations of the numeric values that the physical signals represent. The invention also concerns manipulation of physical signals representing the position of a color value in an array of color values, as well as physical signals indicating other information as described more fully herein. The physical signals may be, for example, electrical signals having a voltage which, when above a predefined threshold represent a logic 1, and which, when below a predefined threshold represent a logic 0. The physical signals representing a value may be carried on several conductors (for example, if the value is represented in binary), and thus the physical signals representing such a value may comprise a group of physical signals. At times the physical signals are stored in the state of a flip-flop, latch, capacitance or other storage circuit in the systems 102 and 106 (FIG. 1). The physical signals can also be electrical signals having an analog voltage or current level which represents a color or luminance value.

It is to be noted also that in many instances it is convenient to describe physical signals in terms of the numbers they represent. For example, the following description uses phrases such as calculating a derivative. This is to be read merely as a shorthand way of defining not only the underlying mathematical steps performed by the circuitry on the values represented by the physical signals, but also the physical steps of receiving signals representing the values, performing a manipulation of those signals corresponding to the mathematical steps, and generating physical output signals representing the indicated result. Such a phrase is further to be read as implying that a finite time is required to propagate signals through the circuitry which performs the manipulation. In similar fashion, other phrases used herein are to be read merely as a shorthand way of defining the physical steps of receiving signals representing values, performing a manipulation on the signals which corresponds to the described function, and generating physical output signals representing the result. The invention also concerns the transmission of information via a physically real medium such as a transmission line or a storage element.

In view of the above, it is understood that the present invention deals with physical entities such as physical signals that represent various numeric values, with physical media, and with image processing hardware that inputs, processes and outputs such physical signals, as well as image data signals which can ultimately cause a physical light image to be rendered and observed by a viewer, for example, on a display.

Figure 3:
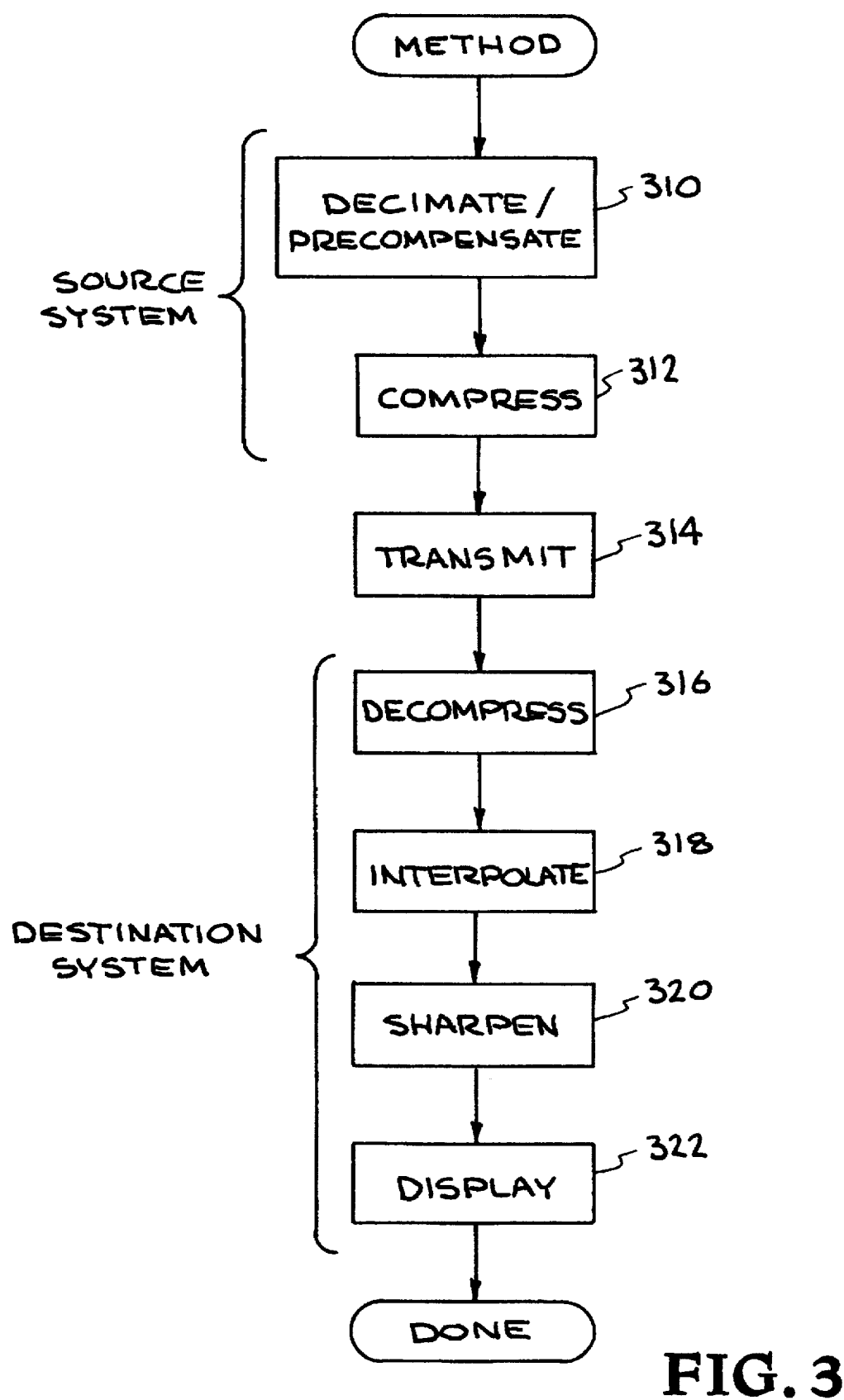
FIGS. 3 and 5 are flow charts illustrating process steps used to transmit an image according to respective embodiments of the invention.

FIG. 3 is a flow chart illustrating the process steps used to compress, transmit and reconstruct an image according to an embodiment of the invention. Initially, an image is provided in the form of a rectangular array of pixels. If the image is black and white, then only one color plane is present, each pixel having associated with it a single value indicating a gray level for the pixel. If the image is a color image, then three color planes may be present, each pixel having associated with it three values indicating respective brightness levels for red, green and blue components of the pixel color. It will be understood that although the red, green and blue color axes are used in the presently described embodiment, other color axes, such as (red minus yellow), (blue minus yellow) and luminance, can be used instead.

Moreover, the array is represented physically in main memory 204 (FIG. 2) as a one-dimensional list of values, each at a respective address. The array is considered to be a two-dimensional array, however, since a predefined formula exists which maps any pair of address values (x,y) to a respective unique element in the list. If the image has three color planes, then a third coordinate value might be provided as well to indicate the particular color plane being selected for each pixel.

Additionally, each element in the image array is referred to herein as a "pixel" because it corresponds to a respective discrete square or rectangle when the image is displayed. Specifically, the array is considered to have a horizontal dimension because when displayed, horizontally sequential ones of the pixel rectangles on the display will be displayed with colors (or gray levels) responsive to the color values stored in the array at a fixed coordinate in one dimension (the vertical dimension) and at sequential coordinates in the other (second) dimension (the horizontal dimension). Similarly, the array is considered to have a vertical dimension because when displayed, vertically sequential ones of the pixel rectangles on the display will be displayed with colors (or gray levels) responsive to the color values stored in the array at a fixed coordinate in the second dimension (horizontal dimension) and at sequential coordinates in the first dimension (vertical dimension).

The flow chart of FIG. 3 illustrates the processing of a single still image. While steps are illustrated as beg performed sequentially, with each step completed before the next step begins, it will be understood that the process can be pipelined in many instances such that subsequent process steps begin before prior process steps are completed. If a sequence of images is beg processed, the processing of one image may begin before the processing of a prior image is completed. Additionally, different images or different parts of an image might be processed according to the process steps of FIG. 3 in parallel on separate hardware, and/or different steps of the process of FIG. 3 with respect to a single image can be performed in parallel on different hardware. The steps illustrated in FIG. 3 (and its detail flow charts) can also be rearranged in some instances without changing the overall functions which are illustrated in the figure.

Referring to FIG. 3, in a step not shown, the input image array may be optionally pre-filtered to minimize noise.

In a step 310, the input image array is decimated in both dimensions by a factor of, for example, two, three or four in each dimension. Other decimation factors can be used instead, including non-integers, and including factors which are different in the two dimensions, but advantages are obtained only if the number of elements in the decimated array is less than the number of elements in the input image array. The decimation step 310 can also include a precompensation step as described in more detail below.

In a step 312, the decimated and optionally precompensated image array is compressed by a conventional image compression algorithm, such as JPEG or a wavelet-based algorithm. If JPEG is used in step 312, then this portion of the algorithm can be implemented using commercially available parts.

The steps 310 and 312 both take place in the source system 102 (FIG. 1). In step 314, the compressed, decimated image is transmitted via the transmission medium 104 (FIG. 1) to the destination system.

In the destination system 106, the transmitted image data is first decompressed in a step 316 using a decompression algorithm that is an inverse of the algorithm used to compress the decimated image in step 312. For example, if step 312 used a JPEG algorithm, then step 316 would use an inverse JPEG algorithm. Again, if JPEG is used, then step 316 can be implemented using commercially available devices.

If desired, a step (not shown) may be inserted between steps 316 and 318 which softens any blockiness that was introduced as an artifact of JPEG compression/decompression. This is accomplished by replacing the values of the two adjacent pixels in the reconstructed image array which are on opposite sides of each border of a JPEG block, with the average of the two values. It is not necessary to transmit the locations of these borders from the source system to the destination system to accomplish this, because JPEG blocks have a fixed size and position in every image which the destination system receives. Specifically, for JPEG, all blocks are eight pixels by eight pixels in size and the blocks cover the entire image. JPEG block border smoothing may not be desirable in a given embodiment, however, because it can sometimes create unwanted artifacts in the image.

In step 318, the destination system interpolates the decompressed transmitted image, back to its original size. Although different interpolation algorithms can be used, the present embodiment utilizes a bilinear interpolation, as described in more detail below.

In step 320, the destination system sharpens the reconstructed image by enhancing the edges in the image to make them more visible. Optionally, weak edges can also be smoothed in step 320 to further improve the image quality. Several sharpening techniques are described in more detail below.

In step 322, the sharpened, reconstructed image is provided to a display, printer or other output device for viewing or further processing.

Figure 4:
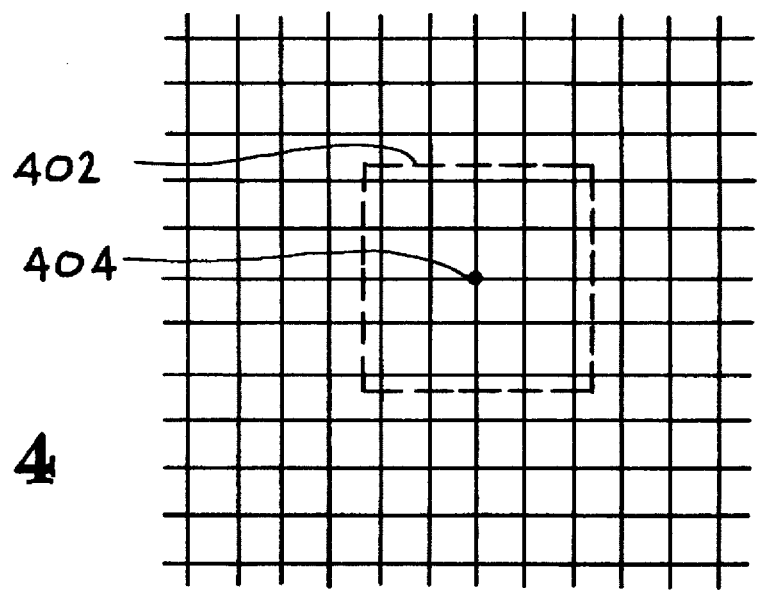
FIG. 4 illustrates a pixel grid of an original image array.

As mentioned, the step 310 of the method of FIG. 3 can include a precompensation as part of, or in addition to, the decimation step. In the present embodiment, which involves decimation by two in each dimension, the value of each pixel in the decimated grid is determined by thinking of it as being centered at the crosspoint center of a 4×4 pixel sub-array of the original image grid. For example, in FIG. 4, if the fine grid represents the original image array, with each small rectangle in the grid representing a pixel, then a pixel in the decimated grid would cover a 16-pixel rectangle 1402 of the original image grid, centered at one of the crosspoints 1404 of the original image grid. Several different methods may be used to choose the value of the pixel in the decimated grid, the idea being that the interpolation filter of step 318 should produce nearly the same original image grid pixel values on reconstruction. In one embodiment, the values of all 16 pixels in the original image array are merely averaged to produce a value for the overlying pixel in the decimated grid. If this method is used, then on reconstruction, in interpolation step 318, all of the pixels in the 4×4 sub-array in the reconstructed image file are given the same average value, and blur filtering can then be performed over the entire reconstructed image file to reduce blockiness.

In another embodiment, an inverse interpolation is performed to obtain a value for each pixel in the decimated grid. Starting with an image I with dimensions n1*n2, this image is to be decimated in each dimension by factors p1 and p2, producing a reduced image J with dimensions m1*m2, from which a restored image $I^{res}$ can be constructed by interpolation. The reduced image is chosen so that the restored image is as close as possible to the original image, in the least-squares sense, so as to allow for relatively easy reconstruction. A respective value is determined for each element of the decimated image array such that the sum of the squares of the differences between each element of the original image array and each corresponding element of a hypothetical array constructed by interpolating the decimated image array by the interpolation function which later will be used to expand the decompressed, reduced image in step 318, would be minimized.

The interpolation is dependent on an interpolation kernel K(i1,i2) that is a function of displacements i1 and i2. K(i1,i2) is a predefined weighing matrix defining, for each restored grid pixel $I^{res}$(i1,i2), the contribution that each pixel in the decimated file J should have in a weighted average to calculate the value to be assigned to the restored grid pixel $I^{res}$(i1,i2). That is, after the decimated matrix J is found, the restored array will be given by $$I^{res}(i1,i2) = \Sigma K(i1-p1*a1+\tfrac{1}{2}, i2-p2*a2+\tfrac{1}{2}) * J(a1,a2).$$

(In the above, a1 and a2 are coordinates of the decimated array, whereas i1 and i2 are coordinates of the full-size image array.)

K can be of any appropriate size in a given embodiment, but for a 4×4 decimation, K is preferably an eight-by-eight array. Thus on interpolation during reconstruction, each pixel value (and only those pixel values) in an eight-by-eight sub-array of the decimated grid will contribute to each pixel of the reconstructed full-size array. The individual values of K should be chosen to decrease with increasing distance from the center of K; a Gaussian roll-off is possible, but a bi-linear roll-off is preferred due to its simplicity. Thus, K is preferably chosen as $$K(i1,i2) = \max\left(1 - \left|\frac{i1}{p2}\right|, 0\right) * \max\left(1 - \left|\frac{i2}{p2}\right|, 0\right).$$

Furthermore, if the kernel is scaled so that it sums up to 1, then the values J(a1,a2) will have (at least approximately) the range of the original image's values, thus the justification for treating it as an image which can be compressed and decompressed with conventional algorithm. Note that in a different embodiment, K can be chosen differently for different pixels on the restored grid.

To assure complete coverage, n1 and n2 must be given by:

$$n1 = (m1-1)*p1$$

$$n2 = (m2-1)*p2$$

A real-life image may not have those convenient dimensions; it is simply extended by copying neighboring pixels to fill up the difference.

The solution matrix J can be found by any method for a given image, but a least-squares solution can be found by minimizing $$\sum_{i1,i2} [I^{res}(i1,i2) - I(i1,i2)]^2$$

leading to a system of linear equations:

$$\sum_{b1,b2} \left[ \sum_{i1,i2} K(i1 - p1*a1 + 0.5, i2 - p2*a2 + 0.5) * \right.$$

$$K(i1 - p1*b1 + 0.5, i2 - p2*b2 + 0.5)] * J(b1,b2) =$$

$$\sum_{i1,i2} K(i1 - p1*a1 + 0.5, i2 - p2*a2 + 0.5) * I(i1,i2)$$

In these equations, the n1*n2 image I(i1,i2) is considered to be only one tile of an infinite image, where each tile has as neighbors other tiles that are equal to the original tile mirrored across their common border. In effect:

$$I(-i1,i2)=I(i1-1,i2)$$

$$I(i1,-i2)=I(i1,i2-1)$$

$$I(n1+i1,i2)=I(n1-i1-1,i2)$$

$$I(i1,n2+i2)=I(i1,n2-i2-1)$$

and so on, for each i from 0 to the corresponding n−1.

This makes the job much easier, and the problem reduces to the following.

Find the interpolation kernel*original image:

$$J_0(a1,a2) = \sum_{i1,i2} K(i1 - p1^*a1 + 0.5, i2 - p2^*a2 + 0.5) * I(i1,i2)$$

which is to be multiplied by 2 for a single border and by 4 for a corner (two borders at once). The kernel auto correlation function is:

$$C(a1 - b1, a2 - b2) = \sum_{i1,i2} K(i1 - p1^*a1 + 0.5, i2 - p2^*a2 + 0.5) *$$

$$K(i1 - p1^*b1 + 0.5, i2 - p2^*b2 + 0.5)$$

which can be easily precalculated, and the resulting equations for J(b1,b2) are:

$$\sum_{b1,b2} C(a1 - b1, a2 - b2) * J(b1,b2) = J_0(a1,a2)$$

Due to the reflections, we have these symmetries, analogous to the ones for the I's:

$$J(-i1,i2)=J(i1-1,i2)$$

$$J(i1,-i2)=J(i1,i2-1)$$

$$J(m1+i1,i2)=J(m1-i1-1,i2)$$

$$J(i1,m2+i2)=J(i1,m2-i2-1)$$

and so on, for each i from 0 to the corresponding m−1.

This symmetry suggests that a solution can be found using some appropriate relative of the Fourier Transform, preferably the Discrete Cosine Transform, using the version that is used in JPEG, but over a much bigger index range (at least, most of the time).

The coefficients are given by:

$$R(n:a,i) = \begin{cases} \dfrac{1}{\sqrt{n}} & \text{if } a = 0, \\ \sqrt{\dfrac{2}{n}} * \cos\left(\dfrac{a^*(2i+1)\pi}{2n}\right) & \text{if } a \neq 0 \end{cases}$$

The value n is the size of the block, which for JPEG, is n=8. The transformed values are:

$$\tilde{J}(a1,a2) = \sum_{i1,i2} R(m1:a1,i1) * R(m2:a2,i2) * J(i1,i2)$$

and the inverse-transformed values are:

$$J(i1,i2) = \sum_{a1,a2} R(m1:a1,i1) * R(m2:a2,j2) * \tilde{J}(a1,a2)$$

When this transform is done on the equation for J(b1,b2), we get $$\tilde{C}(a1,a2)^*\tilde{J}(a1,a2)=\tilde{J}_0(a1,a2)$$

which can easily be solved by division. The transformed kernel auto correlation function is given by:

$$\tilde{C}(a1,a2) = \sum_{i1,i2} \cos\left[\dfrac{a1^*(2i1+1)\pi}{2^*m1}\right] *$$

$$\cos\left[\dfrac{a2^*(2i2+1)\pi}{2^*m2}\right] * C(i1,i2)$$

The solution matrix J calculated as above is a decimated version of the original image file. This solution matrix is essentially another image file, and in step 312 is encoded by any conventional technique for encoding images, such as those incorporated above. Several of such techniques involve a quantization step as an important factor in the significant compression achieved. The quantization step destroys information, which is why such techniques are referred to as being "lossy". The coarser the quantization, the greater the information destruction, but the greater the compression. When compressing the decimated image file in an embodiment of the present invention, it is desirable to choose a finer quantization in these techniques to minimize loss even at the expense of compression.

For example, if the JPEG technique is used for compressing the decimated difference file, then a quantization table should be adopted which is finer than one would expect if the quantization table of the Independent JPEG Group's standard is merely modified for the higher quality factor normally considered appropriate for a decimated image file. Such a quantization table could either be predefined and constant for all images, or optimized for each image separately and transmitted as overhead information to the receiver with each image. The quantization tables are also preferably chosen to be symmetrical about a diagonal from upper left to lower right, and increasing (or at least never decreasing) from left to right and from top to bottom. The preferred quantization tables for JPEG-encoding of these decimated image files are as follows:

| Luminance Table | | | | | | | |
|---|---|---|---|---|---|---|---|
| 16 | 16 | 16 | 16 | 24 | 40 | 51 | 72 |
| 16 | 16 | 16 | 19 | 26 | 58 | 64 | 92 |
| 16 | 16 | 16 | 24 | 40 | 57 | 78 | 95 |
| 16 | 19 | 24 | 29 | 56 | 87 | 87 | 98 |
| 24 | 26 | 40 | 56 | 68 | 109 | 109 | 112 |
| 40 | 58 | 57 | 87 | 109 | 109 | 121 | 121 |
| 51 | 64 | 78 | 81 | 109 | 121 | 121 | 121 |
| 72 | 92 | 95 | 98 | 112 | 121 | 121 | 121 |

| Chrominance Table | | | | | | | |
|---|---|---|---|---|---|---|---|
| 17 | 18 | 24 | 47 | 99 | 99 | 99 | 128 |
| 18 | 21 | 26 | 66 | 99 | 99 | 99 | 128 |
| 24 | 26 | 56 | 99 | 99 | 99 | 128 | 128 |
| 47 | 66 | 99 | 99 | 99 | 128 | 128 | 128 |
| 99 | 99 | 99 | 99 | 128 | 128 | 128 | 128 |
| 99 | 99 | 99 | 128 | 128 | 128 | 128 | 128 |
| 99 | 99 | 128 | 128 | 128 | 128 | 128 | 128 |
| 128 | 128 | 128 | 128 | 128 | 128 | 128 | 128 |

Referring to FIG. 3, the image array which results from step 318 is sharpened, in step 320, to enhance strong edges and soften weak edges. Roughly, edges are pixels which lie at a perceived border between two regions of the image, and typically carry much of the information which a viewer perceives in an image. The edges can be considered to be located on the pixels themselves, in which case only one pixel is identified for each edge, or edges can be considered to be located between pixels, in which case each of the two adjacent pixels are considered to be edge pixels.

In one embodiment, sharpening is performed by applying a filter as now described. Filtering may be performed pixel-by-pixel or, to increase throughput, on a group of pixels at one time. A modified color value is given by weighting the value relative to the position of the pixel according to the function $\vec{I}^{mod}=w(\Delta\vec{x},\Delta\vec{I})$, where w is any of several suitable weighted area sampling functions where one choice of $w(\Delta\vec{x},\Delta\vec{I})$ is $w_x(\Delta\vec{x})w_I(\Delta\vec{I})$. This choice has certain advantages in computation, but a more ideal choice would be:

$$w\left[\left(\frac{\Delta\vec{I}}{I_o}\right)^2+\left(\frac{\Delta\vec{x}}{X_o}\right)^2\right]$$

($I_o$ and $X_o$ are constants.) The weight function is chosen so as to have the property that it decreases as the absolute value of $\Delta\vec{x}$ and the absolute value of $\Delta\vec{I}$ increase. Thus, during step 322, a modified color value for each i'th pixel is achieved by iterating the following equation until convergence for the i'th pixel:

$$\vec{I}_i^{mod}=\frac{\sum_k w(\vec{x}_k-\vec{x}_i,\vec{I}_k-\vec{I}_i^{mod})\cdot\vec{I}_k}{\sum_k w(\vec{x}_k-\vec{x}_i,\vec{I}_k-\vec{I}_i^{mod})}$$

where:

$\vec{I}_j^{mod}=\vec{I}_j$ is the initial condition $\vec{I}_j$ is the color value (scalar for gray scale, 3-vector for full color) for any j'th pixel, and $\vec{x}_j$ is a vector indicating the horizontal and vertical coordinates of any j'th pixel.

In the case where w( ) is separable in $\vec{x}$ and $\vec{I}$, that is w($\Delta\vec{x},\Delta\vec{I}$)=$w_x(\Delta\vec{x})w_I(\Delta\vec{I})$ for some functions $w_x$ and $w_I$, the following equation is interated for each i:

$$\vec{I}_i^{mod}=\frac{\sum_k w_x(\vec{x}_k-\vec{x}_i)\cdot w_I(\vec{I}_k-\vec{I}_i^{mod})\cdot\vec{I}_k}{\sum_k w_x(\vec{x}_k-\vec{x}_i)\cdot w_I(\vec{I}_k-\vec{I}_i^{mod})}$$

The above filtering step has the effect of enhancing edges of the image as reconstructed after decompressing and interpolating (steps 316 and 318). The JPEG compression technique, as well as several other conventional techniques, tend to soften the edges (contours) of an image, and this filter re-sharpens them to improve the perceptual quality of the result. At the same time, this filter further softens edges which are already relatively weak in the decompressed, interpolated image, which, for JPEG-compressed images, primarily includes the borders of each of the JPEG blocks. Thus significantly enhanced images can be obtained using the method of FIG. 3 including the sharpening filter described above. Alternatively, significant greater compression can be obtained without any loss of perceptual quality.

Figure 5:
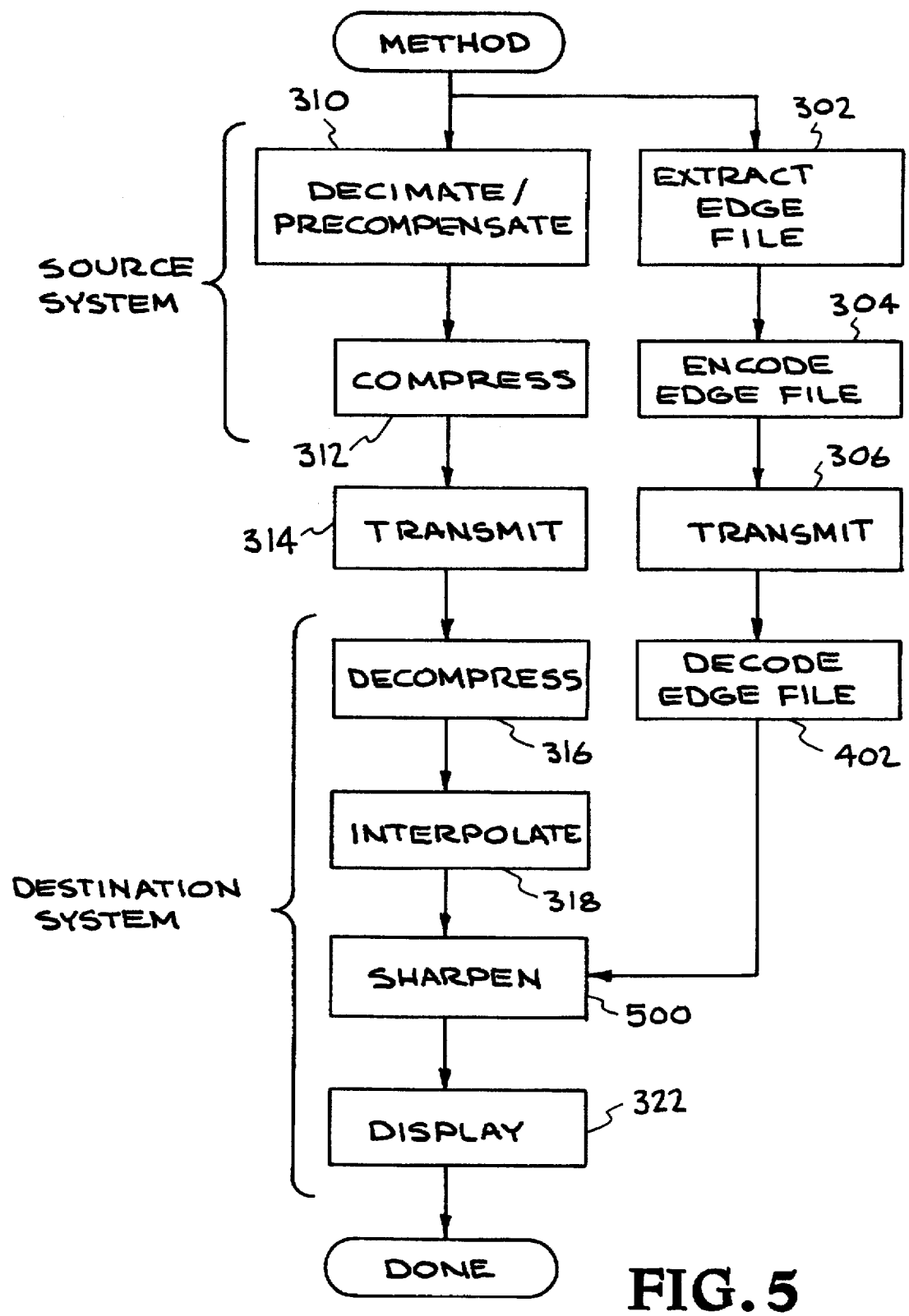

As an alternative, FIG. 5 is a flow chart of a modification of the method of FIG. 3 which is less computationally intensive than that of FIG. 3 because it does not use the above sharpening filter. Instead, edges are identified in the original image by the source system 102. An identification of such edges is transmitted along with (or in correspondence with) the image data itself, and used in a new sharpening step 500 to enhance the sharpness of the reconstructed image. Referring to FIG. 5, steps 310, 312, 314, 316, 318 and 322 remain the same as in FIG. 3. In addition, in a step 302, edges are identified in the image in a manner hereinafter described. In step 302, a file is created which identifies each of the edge pixels in the original image array, together with their color values. As used herein, the term "color value" will be understood to include a "gray-scale value" if the image is a gray-scale image. Also as used herein, the term "file" is used merely to represent a collection of information; it is not necessarily stored separately as a file in a file system in a computer mass storage device. If indeed it is stored in a computer mass storage device, it may occupy only part of a file system file, exactly one file system file, or more than one file system file depending on the implementation.

In a step 304, since the edge information carries much of the perceptual information of the image, the edge file is encoded using one or more of the techniques described hereinafter. The encoded edge file is transmitted to the destination in a step 306. This transmission is, in the present embodiment, packaged together with the compressed image data and transmitted over the same transmission medium as used in step 314. In another embodiment, however, the encoded edge file can be transmitted separately from the compressed image data, and/or can be transmitted over a separate transmission medium.

In a step 402, on a destination system 106, the edge file is decoded using an algorithm complementary to that which was used to encode it in step 304. This data is then used in the sharpening step 500 to enhance the perceptual quality of the interpolated, decompressed image in a manner described hereinafter.

Figure 6A:
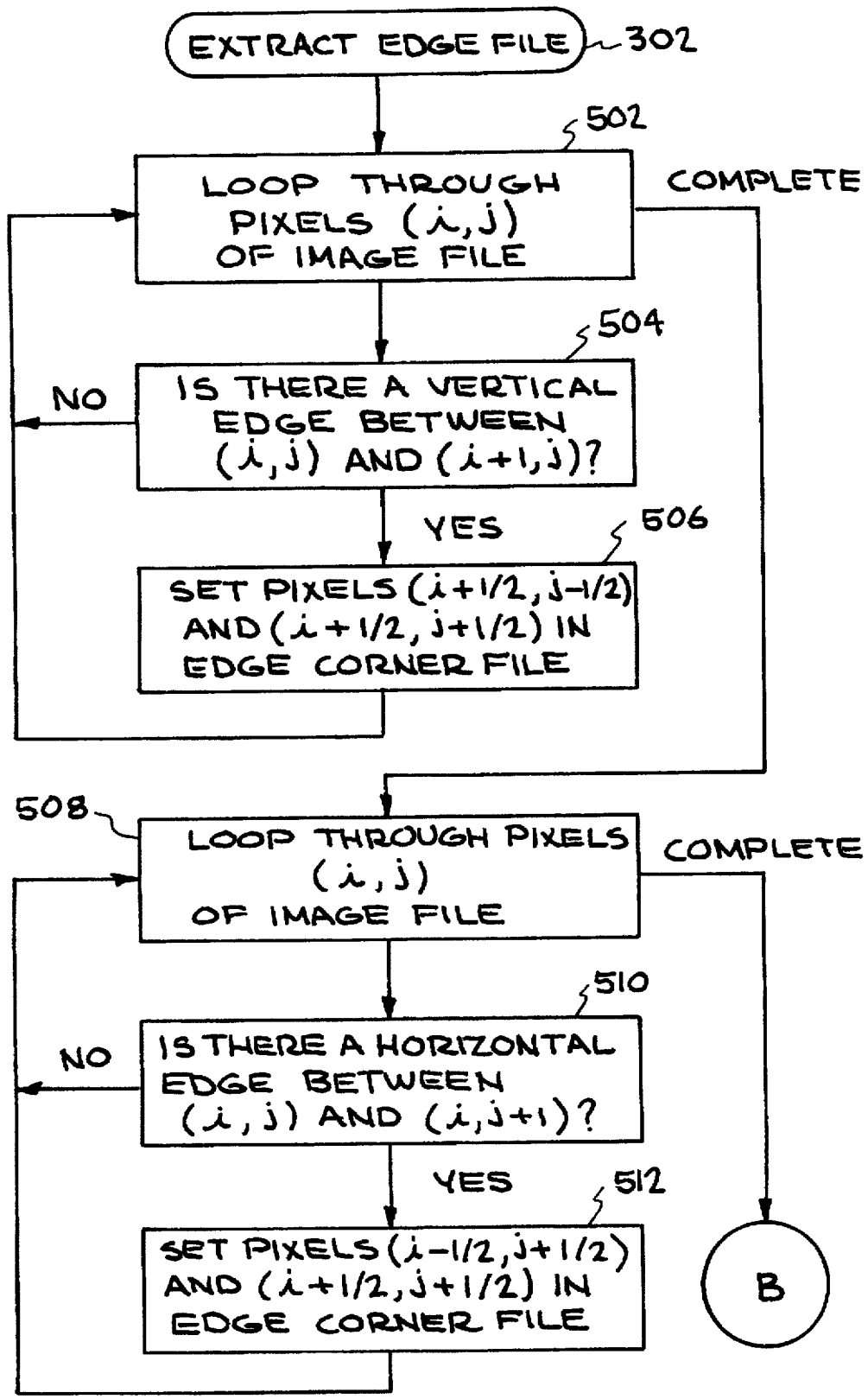
FIGS. 6A and 6B together form a flow chart describing a procedure for performing step 302 in FIG. 5.
Figure 6B:
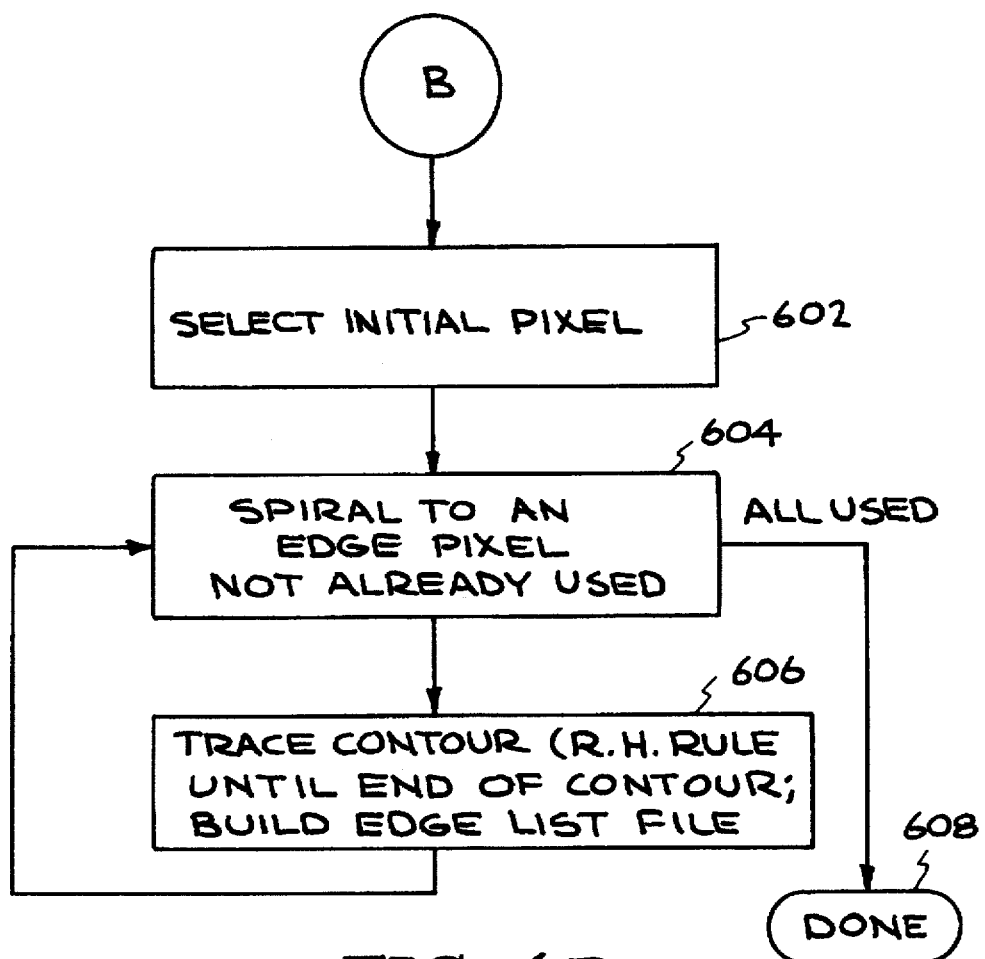

FIGS. 6A and 6B together illustrate a flow chart describing one technique for extracting the edge pixels in step 302 (FIG. 5). Another technique is described hereinafter, and other techniques are set forth in Schuster, Ansari and Bani-Hashemi, "A Hierarchical Edge Detector Using the First and Second Derivative Operators", SPIE, Vol. 1825 Intelligent Robots and Computer Vision XI, pp. 230–241 (1992); Kunt, Bénard and Leonardi, "Recent Results in High-Compression Image Coding", IEEE Transactions on Circuits and Systems, Vol. CAS-34(11), pp. 1306–36 (1987); in Carlsson, "Sketch Based Coding of Gray Level Images", Signal Processing, North Holland, Vol. 15, pp. 57–83 (1988); and the paper by Ran and Farvardin mentioned above. All of such publications are incorporated herein by reference in their entirety.

Referring to FIG. 6A, steps 502, 504 and 506 search for vertical edges between horizontally adjacent pixels in the original image file, and steps 508, 510 and 512 search for horizontal edges between vertically adjacent pixels in the original image file. Specifically, in step 502, all of the pixels (i,j) in the original image array are traversed in a loop. In step 504 of the loop, a determination is made as to whether a vertical edge exists in the image between the current pixel (i,j) and the horizontally next pixel (i+1,j). If not, then the loop continues at step 502. If so, then in step 506, two pixels are set in an edge corner array to indicate that an edge exists between the two indicated corners in the original image file.

Figure 7:
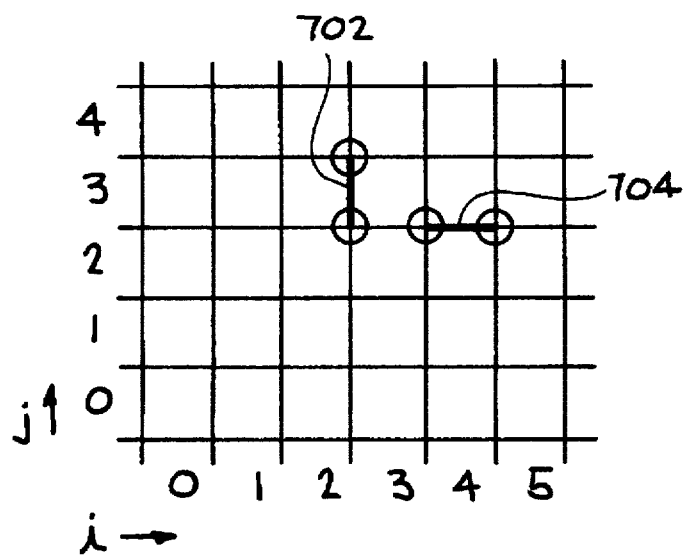
FIGS. 7, 10 and 13 illustrate portions of an image being compressed.

This is best illustrated in FIG. 7, which shows a portion of the original image having 20 pixels numbered (i,j)=(0,0) through (5,4). The image array pixels are represented by the spaces within the rectangles in the grid of FIG. 7, and a vertical edge 702 is shown between pixels (2,3) and (3,3). If the vertical edge 702 is detected in step 504, then in step 506, an edge corner array, containing a Boolean value for each corner in the grid of FIG. 7, is set in step 506. The edge corner array can be thought of as an array with elements corresponding to each of the elements in FIG. 7, but offset by one-half of an element in each of the two dimensions. Thus, for nomenclature purposes, step 506 will set, in the edge corner file, pixels referred to herein as (2½,2½) and (2½,3½).

In step 508, all of the pixels in the image file are again examined in a loop, and in step 510, it is determined whether a horizontal edge exists between pixels (i,j) and (i,j+1) in the original image. Such an edge is illustrated as 704 in FIG. 7. If the edge is detected in step 510, then in step 512 the pixels in the edge corner file representing corners (i–½,j+½) and (i+½,j+½) are set. In the example of FIG. 7, pixels in the edge corner file at array locations (3½,2½) and (4½,2½) are set. The loop then continues in step 508 until all pixels have been examined.

Figure 8:
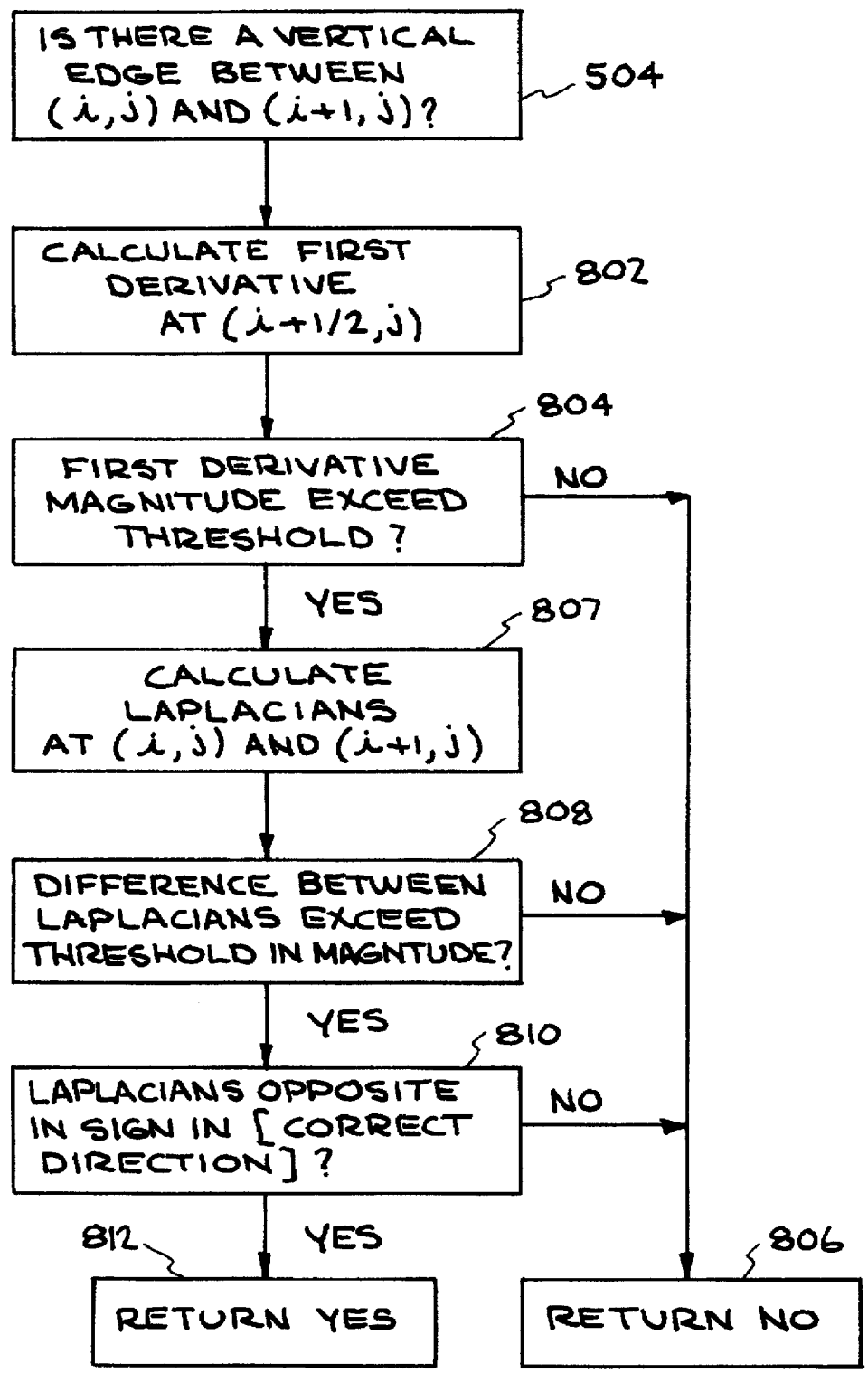
FIG. 8 is a flow chart of a procedure for performing step 504 in FIG. 6A.

The step 504, in which it is determined whether a vertical edge exists between pixels (i,j) and (i+1,j), is performed using local first and second derivatives of the image. The motivation for using both first and second derivatives is that the first derivative is less sensitive to noise than the second derivative, while the second derivative allows for precise localization of an edge. FIG. 8 is a flow chart setting forth this procedure. Referring to FIG. 8, in a step 802, the first derivative is calculated at pixel position (i+½,j). This is accomplished by taking the dot product of a four-pixel by three-pixel sub-array of the image array, centered at the subject interface between pixels (i,j) and (i+1,j), and a first derivative operator given by:

$$\begin{bmatrix} -1 & -1 & +1 & +1 \\ -1 & -1 & +1 & +1 \\ -1 & -1 & +1 & +1 \end{bmatrix}$$

Note that the first derivative operator can be "centered" at (i+½,j) because the operator contains an even number of elements in the horizontal dimension.

In a step 804, it is determined whether the magnitude of the first derivative exceeds a threshold. If not, then there is no vertical edge between (i,j) and (i+1,j) (step 806). If the magnitude of the first derivative does exceed the threshold, then in step 807, Laplacians are calculated at pixels (i,j) and (i+1,j) (i.e. at each of the two horizontally adjacent pixels on opposite sides of the location where a vertical edge is being tested for). A Laplacian is a second derivative, and in the present embodiment is calculated at a given pixel by multiplying (dot product) a 3×3 pixel sub-array centered at the given pixel, by the following Laplacian operator:

$$\begin{bmatrix} +1 & +1 & +1 \\ +1 & -8 & +1 \\ +1 & +1 & +1 \end{bmatrix}$$

If the magnitude of the difference between the Laplacians at the two adjacent pixels do not exceed a threshold, then an edge at the subject location is assumed not to exist (steps 808 and 806). If the magnitude difference does exceed the threshold, then it is determined whether the Laplacians are opposite in sign, and opposite in the correct direction given the sign of the first derivative calculated in step 802 (step 810). The Laplacians are opposite in sign in the "correct direction" if the gradient between them has a sign opposite that of the first derivative. If this last test is satisfied, then an edge has been located (step 812); if not, then an edge has not been located (step 806).

Figure 9:
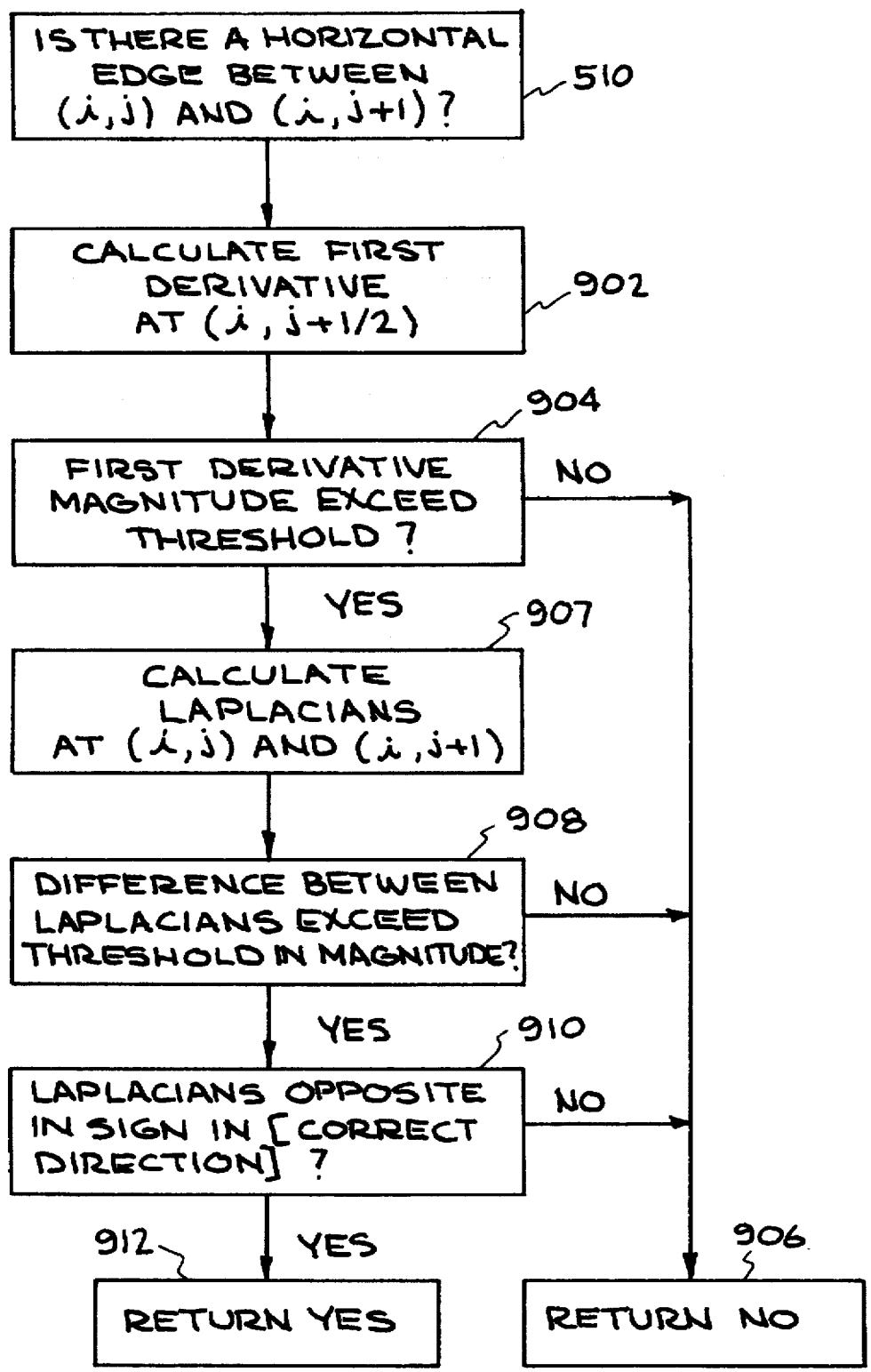
FIG. 9 is a flow chart illustrating a procedure for performing step 510 in FIG. 6A.

Similarly, FIG. 9 sets forth the procedure for determining whether there is a horizontal edge between (i,j) and (i,j+1) (step 510 of FIG. 5). The procedure is similar to that of FIG. 8, except that the adjacent pixels which are being examined are vertically adjacent rather than horizontally adjacent, and the first derivative operator is the transpose of that used in FIG. 8.

Referring to FIG. 9, in a step 902, the first derivative is calculated at pixel position (i,j+½). This is accomplished by taking the dot product of a three pixel by four pixel sub-array of the image array, centered at the subject interface between pixels (i,j) and (i,j+1), and a first derivative operator given by:

$$\begin{bmatrix} -1 & -1 & -1 \\ -1 & -1 & -1 \\ +1 & +1 & +1 \\ +1 & +1 & +1 \end{bmatrix}$$

Note that the first derivative operator can be "centered" at (i,j+½) because the operator contains an even number of elements in the vertical dimension.

In a step 904, it is determined whether the magnitude of the first derivative exceeds a threshold. If not, then there is no horizontal edge between (i,j) and (i,j+1) (step 906). If the magnitude of the first derivative does exceed the threshold, then in step 907, Laplacians are calculated at pixels (i,j) and (i,j+1) (i.e. at each of the two vertically adjacent pixels on opposite sides of the location where a horizontal edge is being tested for. The Laplacian is calculated using the transpose of the dot product operator set forth above for FIG. 8, which in the present case is the same as such dot product operator.

If the magnitude of the difference between the Laplacians and the two pixels do not exceed a threshold, then an edge at the subject location is assumed not to exist (steps 908 and 906). If the magnitude difference does exceed the threshold, then it is determined whether the Laplacians are opposite in sign, and opposite in the correct direction (as defined above) given the sign of the first derivative calculated in step 902 (step 910). If this last test is satisfied, then an edge has been located (step 912); if not, then an edge has not been located (step 906).

Figure 11:
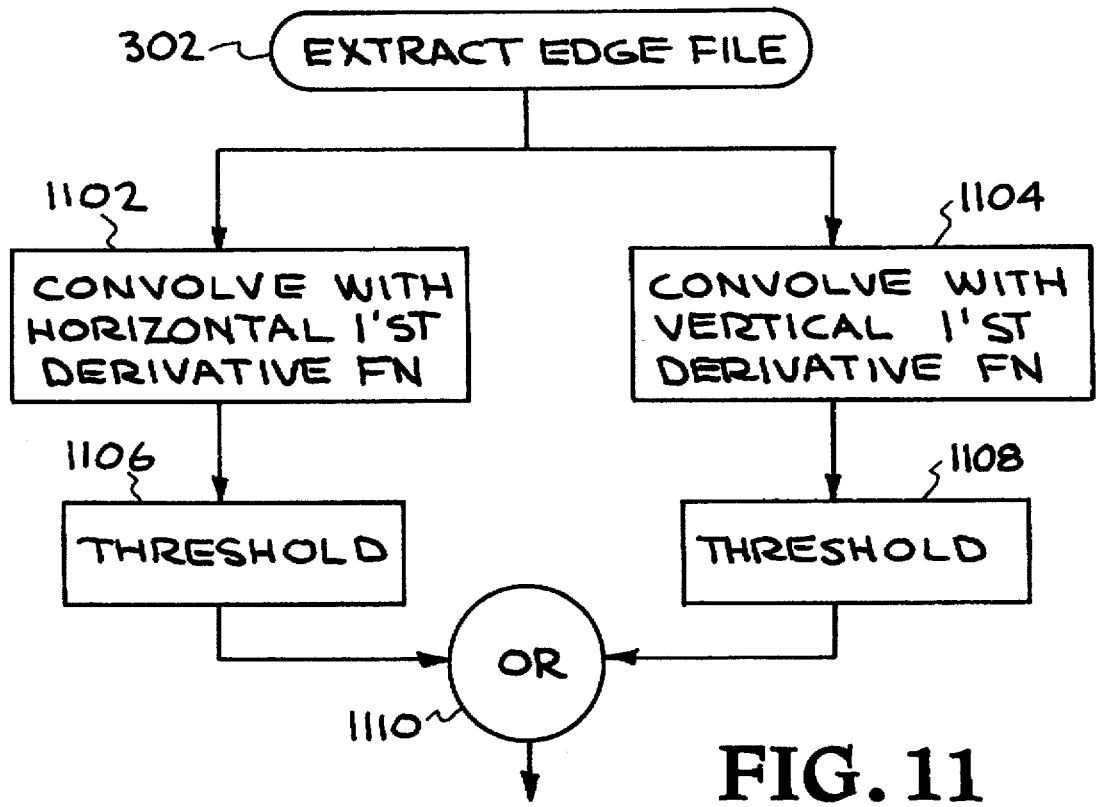
FIG. 11 is a flow chart of another procedure for performing step 302 in FIG. 5.

FIG. 11 is a flow chart of an alternative method for extracting the edge file in step 302 (FIG. 5). In a step 1102, the original image file is involved with a horizontal first derivative matrix given by $$\begin{bmatrix} -1 & 0 & +1 \\ -1 & 0 & +1 \\ -1 & 0 & +1 \end{bmatrix}$$

That is, a new array is created, referred to herein as a horizontal first derivative array, having the same size as the original image array, in which the value of each element in the horizontal first derivative array is calculated by centering the above matrix over the corresponding element of the original image array, multiplying each element of the original image by the corresponding element of the above matrix, and summing the results.

In a step 1104, a vertical first derivative of the original image array is also calculated in the same manner as in step 1102, except that a vertical first derivative matrix operator as follows is used:

$$\begin{bmatrix} -1 & -1 & -1 \\ 0 & 0 & 0 \\ +1 & +1 & +1 \end{bmatrix}$$

In step 1106, the horizontal first derivative image array is subjected to a threshold in each element, to create a binary array containing '1's wherever the horizontal first derivative exceeded a predefined threshold. In step 1108, the vertical first derivative image array is thresholded in the same manner. The two thresholded arrays are then logically ORed, element by element, in a step 1110 to produce the edge file. The edge file thus is an array of binary elements, having the same size as the original image file, each element corresponding to a respective element in the original file and indicating whether that element is (value=1) or is not (value=0) an edge pixel. If the method of FIG. 11 is used to extract the edge file (step 302), then the edge file encoding step 304 can easily be accomplished using any techniques suitable for binary images such as the technique used in the CCITT group IV facsimile standard, described in CCITT (1988) Volume VII fascicle VII.3, Recommendation T.6, incorporated herein by reference.

Returning to FIG. 6A, assuming the method of FIGS. 6A and 6B are used, after the searches have been completed for both vertical and horizontal edges, the edges which have been identified are collected into contours as set forth in FIG. 6B as a continuation of the flow chart of FIG. 6A. As used herein, a contour is a contiguous string of edge pixels (pixels that are adjacent to inter-pixel edges). A contour can have any number of pixels, and a contiguous portion of a contour is itself considered to be a contour.

Figure 10:
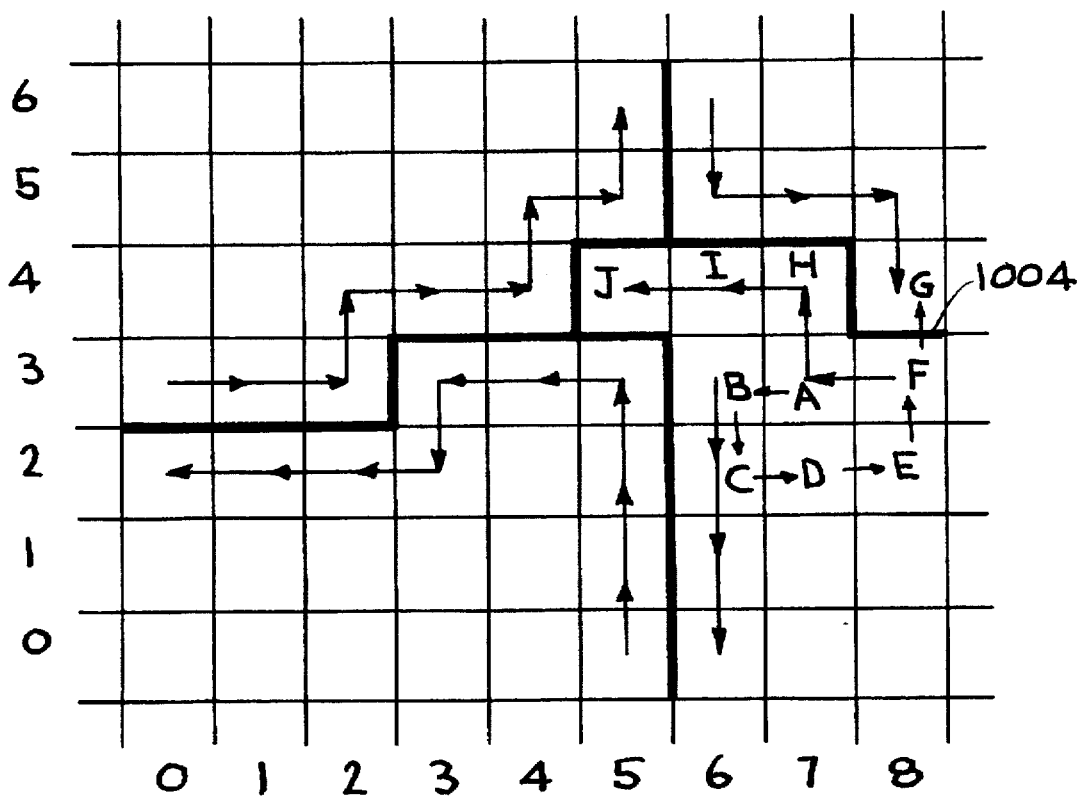

Referring to FIG. 6B, in a step 602, a pixel of the image is selected as a starting pixel. In a step 604, a spiral search is performed beginning at the selected pixel, for an edge pixel which has not already been assigned to a contour. For example, referring to FIG. 10, if the initial pixel is that marked A in the figure, then step 604 first checks the edge corner file to determine whether an edge exists between the pixels marked A and B. If not, then it checks for an edge between pixels B and C, and so on in an outwardly spiraling manner until the edge 1004 is detected between pixels L and M. Pixel L is therefore an edge pixel (since it is adjacent to an edge 1004). In a step 606, pixel L is added to an edge list file as the start of a contour, and the contour is "traced" using a right-hand rule. That is, it is traced by imagining a person standing on pixel L in such a manner that his or her right hand (arbitrary choice; left hand would work equally well) touches the edge 1004. The person then walks forward with his or her hand tracing the edges. Thus in the diagram of FIG. 10, the person will traverse pixels A, H, I and then J, at which point the person can walk no further. Those pixels F, A, H, I and J are then added to the edge list file.

In the edge list file, the first entry of a contour specifies the starting pixel location (i.e. the location of pixel F), a direction indicator indicating the direction to the next pixel in the contour (up, down, left or right), and a color value or values. In one embodiment, the color value can be the value of the edge pixel itself. In a second embodiment, the color value can be the value of a pixel which is a predefined number of pixels away from the contour, although if another edge exists at fewer pixels away than twice the predefined number of pixels, then the color value of the pixel at or just before half the distance to that edge is used. In yet a third embodiment, the color value chosen is the average or a weighted average of the values of all the pixels out to a predefined number of pixels away from the contour, although if another edge exists at fewer pixels out than twice the predefined number of pixels, then the color values of all the pixels out to half the distance to that edge are averaged. The purpose of selecting or averaging color values from a pixel or pixels not immediately adjacent to the edge is to accommodate an observation that if an edge is not a sharp edge, then the color value perceived by a viewer at that edge is not necessarily the color value of the edge pixel itself.

Once the last pixel of a contour is traced and added to the contour in the edge list file (step 606), the last pixel (pixel J in FIG. 10) is then used as the starting pixel for another spiral search to an edge pixel not already assigned to a contour (step 604). Only when all edge pixels have been used in contours, is the edge file complete (step 608).

Note that the edge list file and the edge corner file both represent the same set of edges from the original image, but in different forms. Both are therefore considered herein to be "edge files" produced by step 302 (FIG. 5) and subsequent processing uses whichever form is most convenient. The edge list file is also sometimes referred to herein as a contour file.

Returning to FIG. 5, a number of different techniques can be used to encode the edge file (step 304), including some described in the references incorporated above. One technique is to start from the edge list file, in which contours are already defined, and to group them into symbols of, for example, two edge pixels each. Such symbols are then Huffman encoded (or encoded by an equivalent technique mentioned above). The edge pixel values can also be dithered prior to encoding. This can be accomplished by rounding the first pixel value to a multiple of some quantization value, for example, 32, and then carrying the error forward to the value of the next pixel in the contour. The steps of quantizing and carrying forward of the error are repeated until the end of the contour is reached.

One particularly advantageous technique for encoding the contours is by describing each of them, or portions of them, as parameters to piecewise best-fit curves. The parameters are then encoded and transmitted. Preferred functions for this technique include B-spline functions and low-order polynomial functions such as Hermite and Bezier functions.

Regardless of which technique is used for encoding the contour file, compression can be improved further by first deleting any contours which are shorter than a predetermined length.

Figure 13:
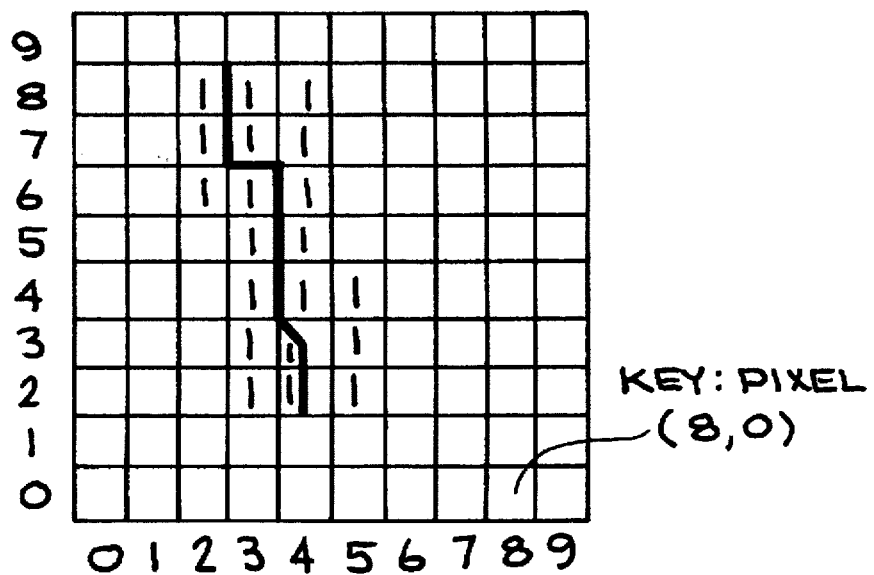
Figure 12:
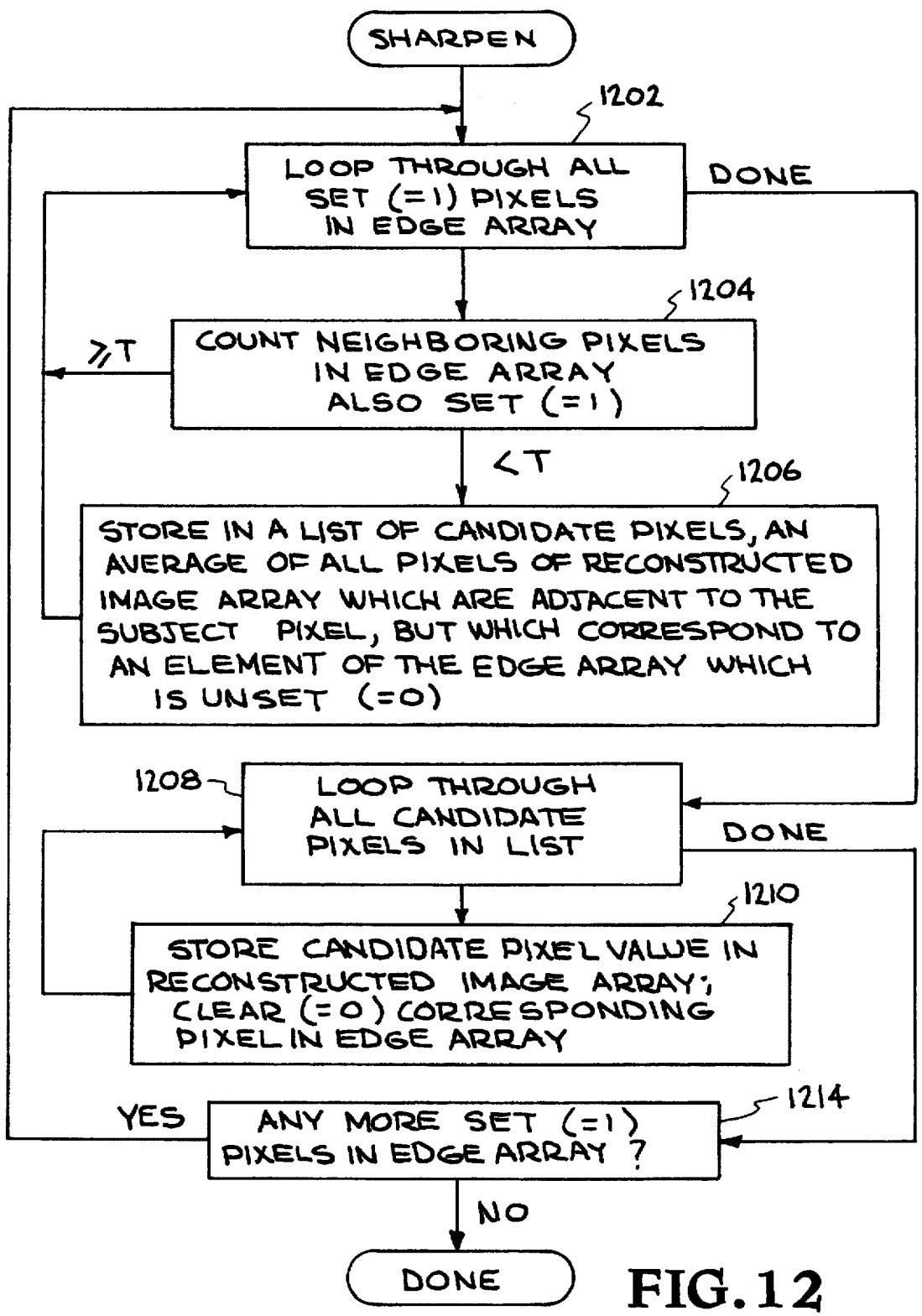
FIG. 12 is a flow chart of a procedure for performing step 500 in FIG. 5.

FIG. 12 is a flow chart of the sharpening step 500 of FIG. 5. This will be understood better with respect to the illustrations set forth in FIG. 13, which represents a portion of a decoded edge file. All elements in the illustration are '0' (unset or clear) except for those indicated as containing '1' (set). The '1's indicate the location of edges in the original image. The '1's in the array in FIG. 13 form an edge "region" surrounding the indicated edge, which is illustrated in FIG. 13 by a heavy line. It can be seen that in places where the edge region is two pixels wide, the edge is considered to be located on the border between the two pixels. In places where the edge region is three pixels wide (or any odd number of pixels), the edge is considered to be located coincidentally with one of the pixels. The edge array can contain many regions such as that shown in FIG. 13, each defining a respective contour in the original image array.

Returning to FIG. 12, step 1202 loops through pixels of the edge array. Only edge pixels (those which are set (=1) in the edge array) are considered.

In step 1204, the routine determines whether the current edge pixel corresponds to one of the outer pixels of an edge region. This determination is made by counting the number of neighboring pixels in the edge array which are also set (=1). If the number is less than a threshold value T, then the current pixel is considered to be an outer pixel of an edge region. T is 2 in the present embodiment, but it may be varied for optimization purposes.

If the current edge pixel is an outer pixel in an edge region, then an average is taken of all the pixels of the reconstructed image array which are adjacent to the subject pixel, but which are not themselves edge pixels (corresponding element in the edge array is unset (=0)). The resulting average is stored, in conjunction with the position of the current edge pixel, in a temporary list of "candidate" pixels.

The loop then continues through other edge pixels in the edge array (step 1202).

When the loop completes, the sharpening routine begins another loop through all of the "candidate" pixels which have been stored in the list (step 1208). In step 1210, each candidate pixel value is stored in the reconstructed image array, replacing the prior value in the reconstructed image array for the subject edge pixel. The corresponding pixel in the edge array is then cleared, so that is no longer designated as an edge pixel.

When the loop 1208 completes, the "candidate" pixel list is cleared and it is determined in step 1214 whether there are any more set (=1) pixels in the edge array. If so, then steps 1202–1210 repeat. When there are no more set pixels in the edge array, the sharpening step is complete.

As previously mentioned, the method described above can be implemented in a number of different kinds of hardware embodiments. One example is that shown and discussed above with respect to FIG. 2. FIG. 14 illustrates a block diagram of another embodiment of the source system 102 (FIG. 1), and FIG. 15 illustrates a block diagram of an embodiment of the destination system 106. Referring to FIG. 14, the image is provided in analog form from an image source 1402 such as a video camera. It is converted to digital form by an analog to digital converter 1404 and provided to a digital signal processor 1406. Digital pixel values arrive to the DSP 1406 scanline by scanline (non-interlaced) from the image source 1402. Note that the image source 1402 and A/D converter 1404 can be replaced by an all digital source, such as for computer-generated images, in a different embodiment. The DSP 1406 performs the decimation/ precompensation step 310 (FIG. 3) and, if the method of FIG. 5 is used, performs the edge extraction and encoding steps 302 and 304 as well. DSP 1406 can be constructed with a CNAPS Server II System or Multiple Server II System, available from Adaptive Solutions, Beaverton, Oreg. The CNAPS servers are described in the following brochures, available from Adaptive Solutions, all incorporated by reference herein: "CNAPS—A Powerful Platform for Pattern Recognition and Signal Processing Problems" (1994); "CNAPS/PC—Parallel Co-Processor Board for the PC" (1994); and "CNAPS Massively Parallel Processor" (1994).

The output of the DSP 1406 is provided in digital form to a JPEG compression chip such as part number CL550 or CL560, available from C-Cube Microsystems, Milpitas, Calif. These chips permit the use of the above-described optimized JPEG quantization tables. They are designed to operate only on images no larger than 320×240, but this is acceptable in the present embodiment because of the decimation step 310 performed in the DSP 1406.

The output of the JPEG compression chip 1408 is transmitted over the transmission medium 104. In the destination system 106, the digital signal from the transmission medium 104 is provided to a JPEG decompression chip 1502, which may be the same kind as the JPEG compression chip 1408 in the source system 102 (the CL550 and CL560 are reversible).

The output of the JPEG decompression chip 1502 is provided to another DSP 1504, which again may be similar to the DSP 1406 in the source system 102. The DSP 1504 performs the interpolation step 318 and sharpening step 320 (FIG. 3), or if the method of FIG. 5 is being used, it performs the interpolation step 318, edge file decoding step 402 and sharpening step 500. The output of DSP 106 is converted to analog form by a digital to analog converter 1506 and provided to the display 1508 or other output device.

The overall master control for the data path in source system 102 is controlled by a control unit 1410. For example, the A/D converter 1404, DSP 1406 and JPEG compression chip 1408 may be manufactured on ISA-compatible plug-in boards for an IBM PC/AT compatible personal computer in which the CPU operates as control unit 1410. The control unit 1410 can perform start and stop synchronization as well as some parts of the image processing method which are difficult to perform on the DSP 1406. Similarly, control unit 1510 can be the CPU in a personal computer having the JPEG decompression chip 1502, DSP 1504 and D/A converter 1506 on one or more plug-in expansion boards.

The hardware implementation illustrated in FIGS. 14 and 15 is sufficient to transmit 24 frames per second, 640×480 pixels per frame, and 24 bits per pixel. This permits full-motion video transmissions within the 1.2 megabit per second bandwidth of a standard T1 line. Alternatively, if the JPEG compression chip 1408 and decompression chip 1502 are replaced by part number CLM4100HE H.261 teleconferencing standard encoder/decoder, then the apparatus of FIGS. 14 and 15 is sufficient to transmit 15 frames per second, 640×480 pixels per frame, 24 bits per pixel. This permits a full videoteleconferencing implementation over a standard 128K bit per second ISDN telephone line. In either case, the effectiveness of existing, commercially available video compression chips is enhanced to the point where full-motion video or teleconferencing can be performed over low cost and widely available telephone transmission media.

Figure 16:
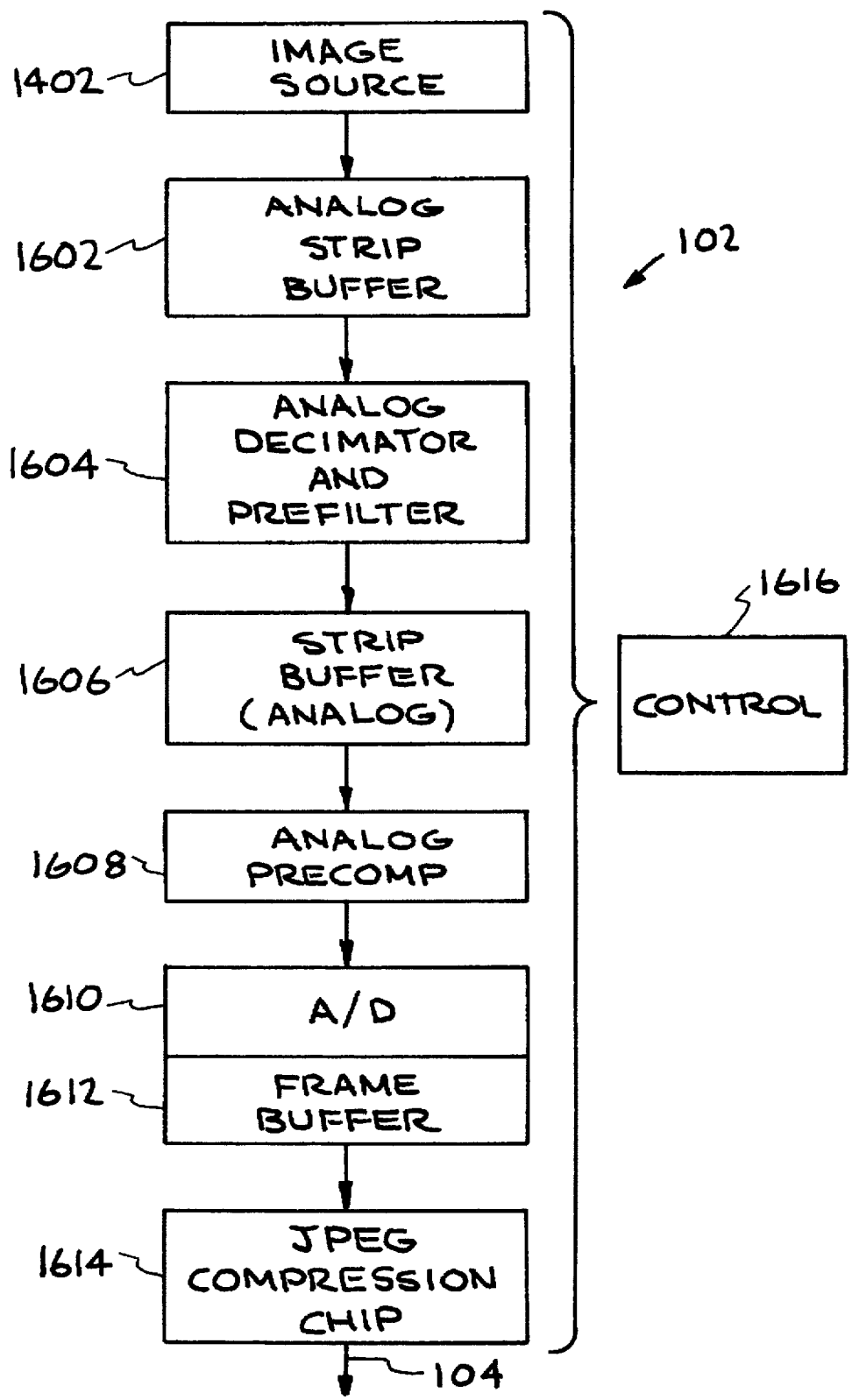
Figure 17:
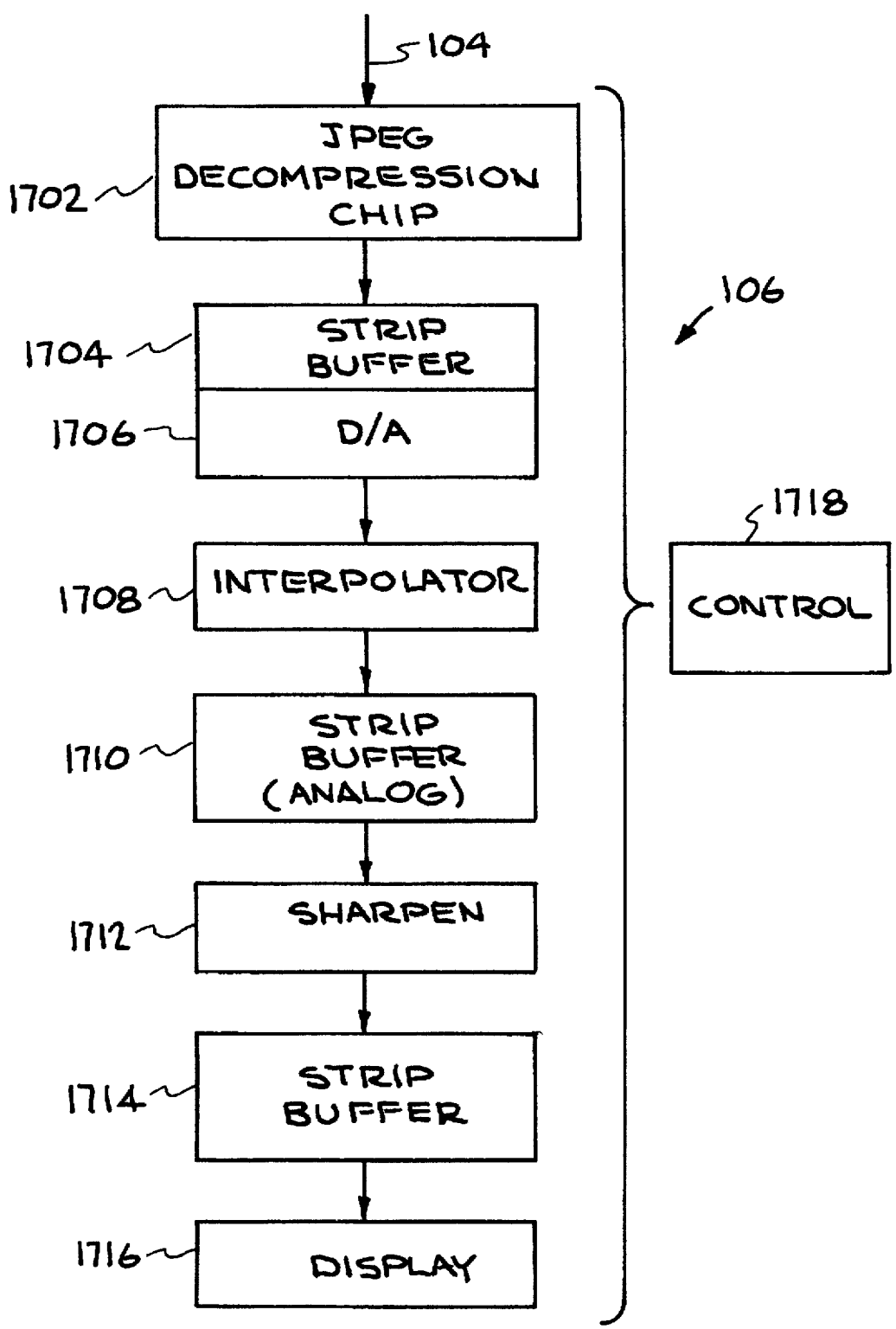

FIG. 16 is a block diagram of another implementation of a source system 102 according to the invention, and FIG. 17 is a block diagram of another implementation of the destination system 106. These implementations can be less expensive than those of FIGS. 14 and 15, since they take advantage of an analog processing chip described in the above-incorporated PROCESS FOR FORMING SYNOPSIS IN NEURAL NETWORKS AND RESISTOR THEREFOR patent application. That application describes a customizable neural network chip which can be used to perform extremely high speed, highly accurate and highly parallel linear transformations (multiply-and-adds). It will be useful to describe this analog processing chip in more detail before explaining the architecture block diagrams of FIGS. 16 and 17.

Figure 18:
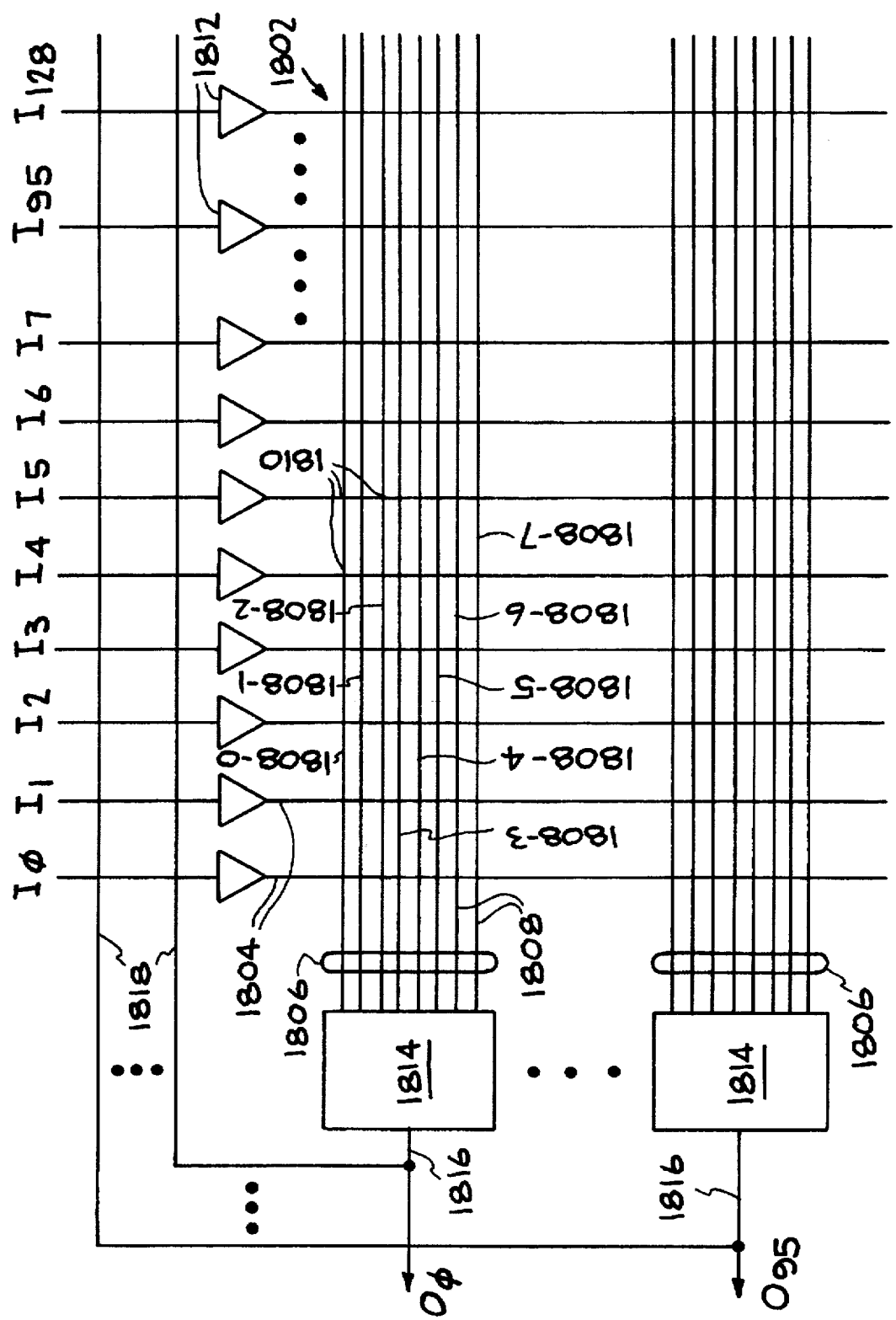
FIG. 18 is a symbolic diagram of an analog multiply-and-add integrated circuit which may be used to implement certain functional blocks in FIGS. 16 and 17.

FIG. 18 is a diagram of the integrated circuit chip which is described in the above-incorporated patent application. It comprises a crosspoint array 1802, comprising a plurality (for example 128) array input lines 1804 oriented in parallel with each other. It also comprises a plurality (for example 96) of groups 1806 of array output lines 1808. The illustration shows only 128 array input lines 1804 and 96 groups 1806 of array output lines 1808, but in actual implementation both numbers are much larger. Each group 1806 may comprise, for example, eight output lines 1808. The array output lines 1808 are oriented in parallel with each other and perpendicularly to the array input lines 1804. The crosspoints 1810 themselves of the array input lines and the array output lines are insulated from each other by a dielectric, but near each crosspoint is a crosspoint interconnection circuit as hereinafter described. Briefly, the crosspoint interconnection circuits each include a single resistor series connected with a laser-severable bar, all of the resistors in the array being identical.

The array input lines 1804 are each driven by the output of a respective input amplifier 1812, which may be a conventional buffer amplifier used for isolation purposes. The inputs to the buffers 1812 are connected to respective pins (not shown) on the integrated circuit package. These pins are the signal input pins of the crosspoint array of FIG. 18, and are designated $I_0, I_1, I_2, \ldots, I_{128}$.

The array output lines 1808 in each given group 1806 of array output lines are connected to respective inputs of a particular summer/amplifier 1814 which corresponds to that group 1806. The array output lines 1808 in other groups 1806 are connected to the inputs of other summer/amplifiers 1814.

The summer/amplifier 1814 is essentially an operational amplifier having eight inputs which are weighted according to a binary pattern. In particular, the current input on the $2^0$ input of the summer/amplifier 1814 will be given half the weight as the current input on the $2^1$ input of the neuron 114, which in turn will be given half the weight of the current input on the $2^2$ input of the summer/amplifier 1814, and so on. Accordingly, if the crosspoint coupling array input line 4, for example, to summer/amplifier 0, is to have a weight of 7, then the resistors coupling array input line 4 with the $2^0$, $2^1$ and $2^2$ inputs of summer/amplifier 0 should be intact, while the resistors coupling array input line 4 with the $2^3$–$2^7$ inputs of summer/amplifier 0 should be disconnected. Each array input line can be coupled to each summer/amplifier in this manner with any desired one of 255 available evenly stepped weights. Accordingly, it can be seen that the integrated circuit chip 1802 is effectively a programmable analog "multiply and add" (M/A) chip which is extremely accurate. The crosspoint array is highly integrated, allowing hundreds of inputs and hundreds of outputs on a single chip.

The outputs 1816 of the summer/amplifiers are connected to output pins (not-shown) of the chip, which are designated $O_0, O_1, O_2, \ldots, O_{95}$. These outputs are also connected back via severable architectural definition lines 1818 to the input lines. They may be connected either to respective ones of the input lines such as $I_0$–$I_{95}$, or they may all be connected to all of the input lines.

The chip of FIG. 18 is mass produced with a fully connected crosspoint array 1802, and with all of the severable architectural definition lines 1818 fully connected. In order to define the network architecture and the interconnection weights desired for the present application, selected ones of the architectural definition lines 1818 and selected ones of the severable bars in the array are severed using a laser.

Figure 19:
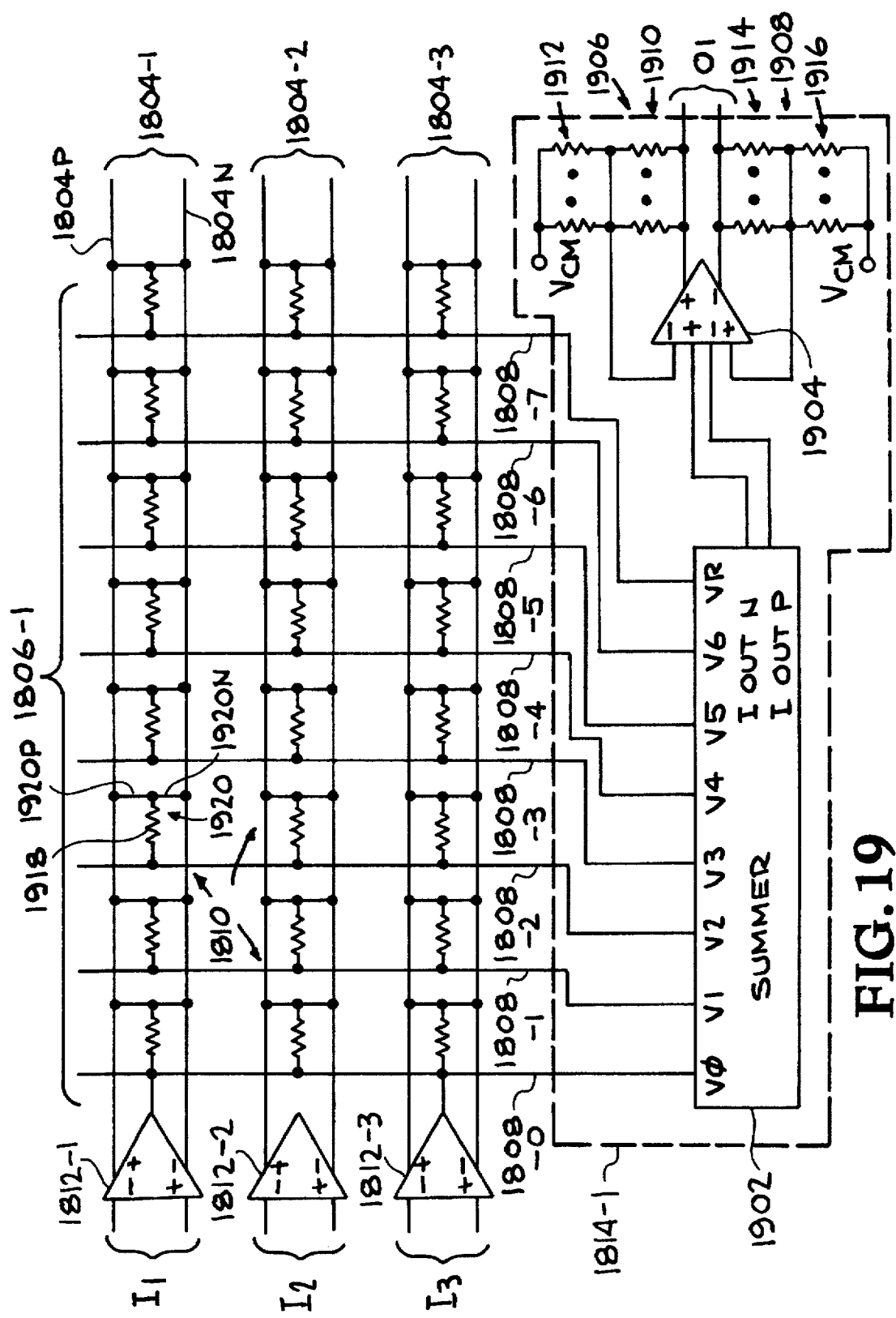
FIG. 19 is a schematic diagram of a portion of the network of FIG. 18.

FIG. 19 is a more detailed diagram of a portion of the network of FIG. 18. In particular, only three of the inputs are shown (I1, I2 and I3) and one neuron output O1. The input buffers 1812-1, 1812-2 and 1812-3 are differential input, differential output, unity gain operational amplifiers. If desired, one or more of these amplifiers may be converted to single input, differential output amplifiers by conventionally altering the feedback circuit around the amplifier.

Each of the summer/amplifiers 1814 contains a binary weighted summer section 1902, the differential current output of which is connected to differential inputs of a substantially linear buffer amplifier 1904. The amplifier 1904 has a differential output which forms the output of the summer/amplifier 1814, and which is fed back to differential inputs of the amplifier 1904 via a pair of resistor dividers 1906 and 1908. The resistor divider 1906 comprises a plurality of parallel-connected resistors 1910 coupled between the positive differential output and the negative differential feedback input of the amplifier 1904, and a similar plurality of parallel-connected resistors 1912 coupled between the negative feedback input of buffer 1904 and a common mode voltage Vcm. The resistor divider 1908 comprises a plurality of parallel-connected resistors 1914 coupled between the negative output of amplifier 1904 and the positive feedback input, and a similar plurality of parallel-connected resistors coupled between the positive feedback input of amplifier 1904 and Vcm. The resistors in the feedback networks 1906 and 1908 are all identical to all the other resistors in the array, and include series-connected laser-severable bars. Thus the gain of the amplifier 1904 can be programmed in the same laser cutting step in which the interconnection weights are defined and the network architecture is defined. Additionally, since the feedback resistors and the array resistors are all fabricated at the same time, their resistance will match closely, thereby improving temperature tracking performance. While a parallel-connected resistor feedback network is shown in FIG. 19, it will be understood that other types of networks may be used instead, including one which is binary weighted in the same manner as the eight inputs to the summer/amplifier 1814.

The crosspoint array 1802 array input lines 1804 preferably consist of respective differential pairs driven by respective input amplifiers 1812. The array output lines 1808 can be single-ended. Each of the crosspoints 1810 is initially fabricated fully-connected, and later severed appropriately. A fully-connected crosspoint comprises a resistor 1918 connected between one of the array output lines 1808 and the middle of a respective severable bar 1920. The severable bar 1920 is connected across from one line of the differential array input pair 1804 to the other. Thus the severable bar 1920 has a portion 1920P connected between a terminal of the resistor 1918 and the positive line of a differential pair, and a second portion 1920N connected between the terminal of the resistor 1918 and the negative line of the differential pair. Each of the resistors 1918 dissipates power dependent upon the voltage differential between its input and the average voltage of all the inputs which are coupled via the crosspoint array to the same array output line 1908.

The interconnection weight between one of the array input pairs 1804 and one of the summer/amplifiers 1814 is defined by all eight resistors which are connected between the pair 1804 and the eight inputs 1808 to the summer/amplifier 1814. Any one of 255 evenly stepped interconnection weights can be programmed, ranging from −127 to +127. The high order input 1808-7 to a summer/amplifier 1814 defines the sign; if the portion 1920N of the severable bar 1920 for that resistor is left intact while the portion 1920P is severed, then the remaining resistor connections in the crosspoint define a positive weight. If the portion 1920P is left intact and the portion 1920N is severed, then the remaining connections in the crosspoint define a negative weight. After the sign of the weight is defined in the high order resistor, then each of the other resistors in the crosspoint define a binary '0' if they are connected to the same line in the differential pair 1804 as is the high order resistor, or a logic '1' if they are connected to the opposite line in the differential pair 1804 as the high order resistor. The full range of weights can therefore be programmed by lasersevering selected portions 1920N or 1920P of the severable bars 1920. It will be appreciated that other resolutions can be implemented using different numbers of binary inputs.

The technique used in the chip of FIG. 18 permits the fabrication of the crosspoint array 1802 with a large number of resistors which are all identical, thereby simplifying the fabrication process, yet also providing a wide range of available interconnection weights for selection (e.g. 255 steps for an 8-input summer/amplifier). It will be appreciated, however, that other resistor arrangements can be used for the connection circuits. For example, summer/amplifiers without binary weighted inputs may be used, together with interconnection circuits which are similar to any of the networks described in Shier U.S. Pat. No. 4,782,320, incorporated herein by reference.

In fabrication, both the array output lines 1408 and severable conductors 1920 are formed in the metal 1 layer. The thin film resistor 1918 extends from an array input line 1808 to the middle of a severable conductor 1920 and perpendicular to both. There is no dielectric between the thin film resistor 1918 and the metal 1 layer. The array input lines 1804 (including both lines 1804P and 1804N of the differential pair) are formed in a metal 2 layer which is formed over an oxide covering the metal 1 layer. The metal 2 layer contacts both ends of the severable conductor 1920 through respective vias.

The metal 1 is formed over an oxide layer which is itself grown over the silicon substrate. The metal 1 layer is primarily a tungsten layer. A thin layer of titanium tungsten is formed at the interface between the tungsten layer and the oxide. Another layer of titanium tungsten is formed over the tungsten, and a thin layer of amorphous silicon is formed over that. It is believed that during an annealing step, titanium silicide is formed at the interface between the latter two layers, and may extend mostly through the amorphous silicon layer.

Tungsten is chosen as the refractory material mainly because of its mechanical strength, its resistance to electric migration, and its compatibility with conventional silicon processing. Other refractory metals such as molybdenum may also suffice. In addition, it has been discovered that this tungsten-based metal layer severs unusually cleanly upon the application of a laser beam. The relatively high resistivity of tungsten as compared to more conventional aluminum is not a problem in the crosspoint array 1802 since the total resistance which it adds in different length signal paths through the crosspoint array 1802 is still negligible compared to the extremely large resistance of the doped amorphous silicon thin film 1918.

The resistor material 1918 is amorphous silicon doped with boron. Amorphous silicon is desirable as a resistor because it is radiation-hard and because it provides wide flexibility in the choice of resistor values. Other resistor materials may be used instead of amorphous silicon, but they should be amorphous or at most, microcrystalline. If a microcrystalline material is used, in order to maintain uniformity across different resistors on a chip, the material should be such that normal process variations will not significantly affect either the quantity of grain boundaries or their structure.

The resistor material 1918 is formed directly over the metal 1 layer without any dielectric between the two layers. The more common method of forming a dielectric layer over metal 1, opening vias in the dielectric, and depositing resistor material over the dielectric, may be used instead.

The individual processing steps for fabricating the crosspoint array 1802 are described in the above-incorporated patent application. Resistors 1918 fabricated in this manner have been found to have a very high resistivity, on the order of 4 megohms per square. Such resistors are extremely compact and do not require meandering to achieve such high resistance values. A 4 megohm resistor can be formed, for example, in a 10 micron×10 micron square. Such resistors are also highly linear (with a linearity of less than 0.1%) and highly uniform (with a standard deviation in resistance less than 0.8%). The resistors may be fabricated in smaller sizes such as 3 micron by 3 micron with some loss of uniformity due to non-uniform under-cutting by etchant.

Returning to FIG. 16, the source system comprises an image source 1402, which provides analog image data, scanline-by-scanline, non-interlaced, to an analog strip buffer 1602. The strip buffer may be CCD-based and should have sufficient capacity to store at least six scanlines of pixel data. The first four scanlines are needed because a 4×4 pixel prefilter is used in the 2:1×2:1 decimation 1604, described below, and storage for the next two scanlines are provided so that they may be filled from the image source 1402 while the decimation is taking place on the first four scanlines.

The output of the analog strip buffer 1602 is provided to an analog decimator and prefilter 1604. The decimator and prefilter 1604 produces one output pixel for every four input pixels using a 4×4 filter defined as follows:

$$\frac{1}{16} \begin{bmatrix} 1 & 3 & 3 & 1 \\ 3 & 9 & 9 & 3 \\ 3 & 9 & 9 & 3 \\ 1 & 3 & 3 & 1 \end{bmatrix}$$

Specifically, this matrix is placed over the top left 4×4 sub-array of the input image array, and a dot product is calculated. The dot product forms the top left pixel of the decimated/prefiltered image array. The matrix is then moved to the right by two pixels of the input image array, and another dot product is calculated. This dot product forms the next pixel in the top row of the decimated/prefiltered image array. This process continues until the top right-hand pixel in the decimated/prefiltered image array is calculated. The operator matrix is then returned to the left-side of the input image array, but moved down by two input image array pixels. The dot product is calculated and this forms the left-most pixel on the second line of the decimated/prefiltered image array, and so on. It can be seen that since all of the input data for the first four input image scan lines is present in the strip buffer before processing begins, one entire row of the decimated/prefiltered image array can be calculated in parallel. Moreover, if the strip buffer is made large enough to accommodate ten input image scanlines at a time, then two rows of decimated/prefiltered image pixels can be generated in parallel using the first six input image rows while the next four input image rows are being filled from the image source 1402. In fact, by increasing the size of the analog strip buffer 1602, any number of decimated/prefiltered image array rows can be calculated in parallel. Moreover, all the pixels in a row of the decimated/prefiltered image can be calculated in parallel as well, since all the data is present in the analog strip buffer 1602 for the row before the processing begins.

The above operator is chosen because it is bilinear, rendering the result "separable", in that the precompensation filter can be performed independently in the horizontal and vertical dimensions. Note also that since the dot products calculated by the decimator/prefilter 1604 are simply multiply-and-adds, the decimator/prefilter 1604 is implemented easily using the crosspoint array chip of FIG. 18.

The output of the analog decimator and prefilter 1604 is provided to another analog strip buffer 1606. The strip buffer 1606 is large enough to accommodate all of the pixels in the decimated/prefiltered image array which are produced using the number of original image scanlines stored in the analog strip buffer 1602.

The output of the strip buffer 1606 is provided to the input of an analog precompensation circuit 1608, which basically convolves the image with a large filter to optimize it for the interpolation to take place on the receiving end. As previously described, the precompensation filter performs the function $$I'_{k,l} = \sum_{a,b} w_{a,b} I_{k+a,l+b}$$

where I is the decimated and prefiltered image array and I' is the precompensated decimated and prefiltered image array. w is an array being the precompensation operator. k and l are indices into I or I', and a and b are indices into the precompensation operator w. The precompensation operator w may be of any size, preferably, but not necessarily, square, and the larger it is the more satisfactory the results will be.

In the present embodiment, four (bilinear) interpolation operators will be used in step 318 to interpolate by a factor of two in each dimension. Specifically, inside each square of four pixels of the reconstructed decimated image array, a smaller square of four full resolution pixel values will be calculated. The four full resolution pixel values will be calculated with the following operators, each multiplied (dot-product) with the four pixel values of the reconstructed decimated image array:

| full resolution pixel position | operator |
| --- | --- |
| top left | $\frac{1}{16} \begin{bmatrix} 9 & 3 \\ 3 & 1 \end{bmatrix}$ |
| top right | $\frac{1}{16} \begin{bmatrix} 3 & 9 \\ 1 & 3 \end{bmatrix}$ |
| bottom left | $\frac{1}{16} \begin{bmatrix} 3 & 1 \\ 9 & 3 \end{bmatrix}$ |
| bottom right | $\frac{1}{16} \begin{bmatrix} 1 & 3 \\ 3 & 9 \end{bmatrix}$ |

For these interpolation operators, an optimized precompensation operator is given by $$w_{a,b} = 4 \left( -\frac{1}{3} \right)^{|a|+|b|}$$

which is separable as $$w_{a,b} = w_a \cdot w_b$$

where $$w_a = 2 \left( -\frac{1}{3} \right)^{|a|}$$

and $$w_b = 2 \left( -\frac{1}{3} \right)^{|b|}$$

Thus $I'_{k,l}$ can be rewritten as $$I'_{k,l} = \sum_b w_b \left( \sum_a w_a \cdot I_{k+a,l+b} \right)$$

separating the horizontal and vertical components of the calculation. The precompensation filter 1608 can therefore be implemented as shown in FIG. 20.

Figure 20:
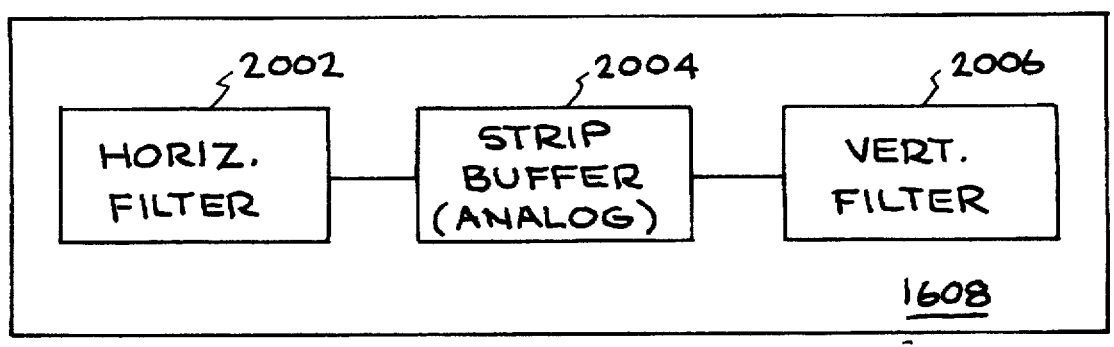
FIG. 20 is a block diagram of an embodiment of block 1608 in FIG. 16.

Referring to FIG. 20, the precompensation filter 1608 comprises a horizontal filter 2002, the output of which is provided to an analog strip buffer 2004, the output of which is provided to a vertical filter 2006. The output of a vertical filter 2006 forms the output of the precompensation filter 1608. The horizontal filter 2002 convolves the decimated image array with the operator $w_a$, and the vertical filter 2006 convolves the result with $w_b$. Both of these filters 2002 and 2006 can be implemented easily using the analog crosspoint chip FIG. 18. Many pixels can be calculated in parallel using the techniques described above with respect to the decimator and prefilter 1604.

Returning again to FIG. 16, the output pixels of analog precompensation circuit 1608 are converted to digital form using an A/D converter 1610 and stored in a frame buffer 1612. A JPEG or MPEG compression chip 1614 is then used in the same manner as the compression chip 1408 (FIG. 14). The source system 102 also includes a control circuit 1616 which, like control circuit 1410 (FIG. 14), can be the CPU of a personal computer.

It will be appreciated that if the algorithm of FIG. 5 is used instead that of FIG. 3, the edge file extraction step 302 can also be easily implemented using the analog crosspoint chip of FIG. 18, since it is primarily a convolution.

In the destination system 106, as shown in Fig. 17, the transmitted image data is first provided to a JPEG or MPEG decompression chip 1702 such as chip 1502 (FIG. 15). The output of a decompression chip 1702 is stored in a digital strip buffer 1704 and converted to analog form by a D/A converter 1706. The output of a D/A converter 1706 provided to an interpolator 1708, which interpolates two pixel values in each dimension for each pixel value of the JPEG-decompressed image. Once again the four operators $$\frac{1}{16} \begin{bmatrix} 9 & 3 \\ 3 & 1 \end{bmatrix}, \frac{1}{16} \begin{bmatrix} 3 & 9 \\ 1 & 3 \end{bmatrix}, \frac{1}{16} \begin{bmatrix} 3 & 1 \\ 9 & 3 \end{bmatrix}, \text{and}$$

$$\frac{1}{16} \begin{bmatrix} 1 & 3 \\ 3 & 9 \end{bmatrix}$$

are used as described above and the interpolation is performed using the analog crosspoint chip of FIG. 18. The results are stored in analog strip buffer 1710.

These results are used in the sharpening filter 1712. As previously described, if the algorithm of FIG. 3 is being used, a modified color value for each pixel i is achieved by iterating the equation $$\vec{I}_i^{mod} = \frac{\sum_k w(\vec{x}_k - \vec{x}_i, \vec{I}_k - \vec{I}_i^{mod}) \cdot \vec{I}_k}{\sum_k w(\vec{x}_k - \vec{x}_i, \vec{I}_k - \vec{I}_i^{mod})}$$

until $\vec{I}_i^{mod}$ converges using $\vec{I}_i^{mod} = \vec{I}_i$ as the initial condition. In practice, the following iteration is used:

$$\vec{I}_i^{mod} = \frac{\sum_k w_x(\vec{x_k} - \vec{x_i}) \cdot w_I(\vec{I_k} - \vec{I_i^{mod}}) \cdot \vec{I_k}}{\sum_k w_x(\vec{x_k} - \vec{x_i}) \cdot w_I(\vec{I_k} - \vec{I_i^{mod}})}$$

Figure 21:
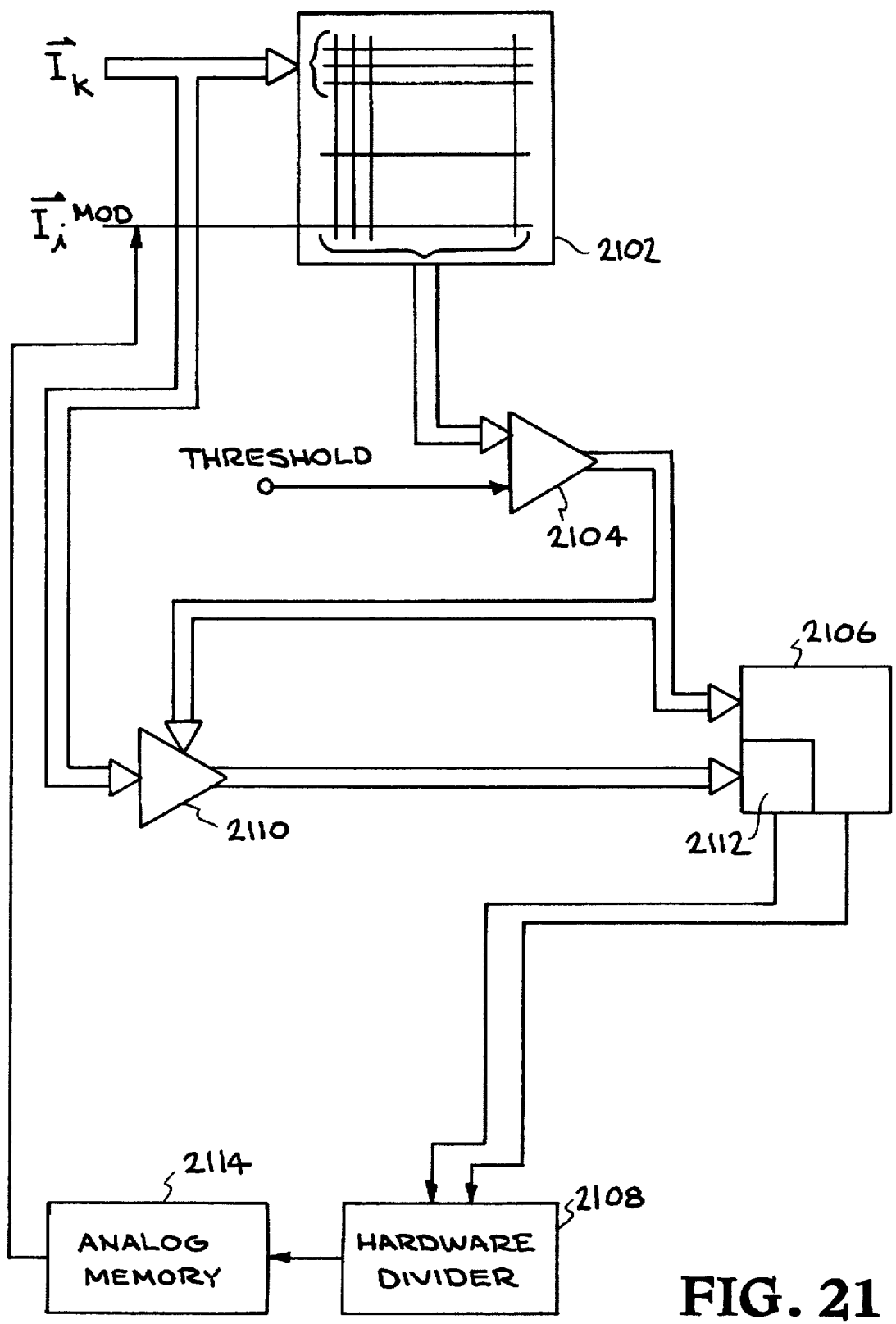
FIG. 21 is a block diagram of an embodiment of block 1712 in FIG. 17.

FIG. 21 illustrates how this function can be implemented using the crosspoint chip of FIG. 18.

Referring to FIG. 21, the k color vectors $\vec{I_k}$ (three color values per k) are provided from the strip buffer 1710 (FIG. 17) into a plurality of inputs to the crosspoint array chip 2102. An analog initial condition vector is also provided to the chip 2102 as $\vec{I}_i^{mod}$. The chip 2102 is arranged to multiply each $\vec{I_k}$ by unity, separately in each of k columns of the array, and to multiply $\vec{I}_i^{mod}$ by −1 in all of the k columns of the array. When each column is summed, k outputs are produced (in each of three color planes), each k'th output having an analog value $\vec{I_k} - \vec{I}_i^{mod}$.

In the present embodiment, $$w(\vec{x_k} - \vec{x_i}, \vec{I_k} - \vec{I_i}) = w_x(\vec{x_k} - \vec{x_i}) w_I(\vec{I_k} - \vec{I_i})$$

where $$w_I(\vec{I_k} - \vec{I_i}) = \begin{cases} 1 & \text{if } |\vec{I_k} - \vec{I_i}| < \text{Threshold} \\ 0 & \text{if } |\vec{I_k} - \vec{I_i}| \geq \text{Threshold} \end{cases}$$

and $$w_x(\vec{x_k} - \vec{x_i}) = \begin{cases} 1, & 0 < r \leq 1 \\ 1 - (r-1), & 1 < r \leq 2 \\ 0, & r > 2 \end{cases}$$

where $$r = |\vec{x_k} - \vec{x_i}|.$$

In effect, the following weight values are used for $w_x$:

| | | |
|---|---|---|
| 0.6 | 1.0 | 0.6 |
| 1.0 | 1.0 | 1.0 |
| 0.6 | 1.0 | 0.6 | because the distances from the center are:

| | | | | |
|---|---|---|---|---|
| 2.8 | 2.2 | 2.0 | 2.2 | 2.8 |
| 2.2 | 1.4 | 1.0 | 1.4 | 2.2 |
| 2.0 | 1.0 | 0.0 | 1.0 | 2.0 |
| 2.2 | 1.4 | 1.0 | 1.4 | 2.2 |
| 2.8 | 2.2 | 2.0 | 2.2 | 2.8 | where the center value (0.0) refers to the pixel being determined.

Thus, to implement $w_I$, the k output vectors of the chip 2102 are connected in parallel to respective inputs of parallel comparators 2104, the other input of each of which receives the analog threshold value. Thus, the k output vectors of the comparator 2104 represent $w_I(\vec{I_k} - \vec{I}_i^{mod})$, respectively.

The outputs of comparator 2104 are connected to more parallel inputs of the crosspoint array chip, this portion designated for convenience as 2106. In array 2106, each k'th input is multiplied by the positional weight function $w_k$ of the positional distance of the k'th pixel from the i'th pixel, and sums all of the products to produce a single output value representing $$\sum_k w_x(\vec{x_k} - \vec{x_i}) \cdot w_I(\vec{I_k} - \vec{I}_i^{mod})$$

This analog value is provided to the "denominator" input of a hardware divider 2108.

The k outputs of comparator 2104 are also connected to the control inputs of k respective switches 2110, the inputs of which are connected to receive the input color vectors $\vec{I_k}$, respectively. Each k'th switch 2110 passes its input vector $\vec{I_k}$ if the control input on the k'th switch is 1, or outputs a 0 value if the k'th control input is 0. Thus it can be seen that the switches 2110 output k vectors, each k'th vector having a value $w_I(\vec{I_k} - \vec{I}_i^{mod}) \cdot \vec{I_k}$.

The k output vectors of switch 2110 are connected to still further inputs of the crosspoint array chip, this portion designated 2112 in FIG. 21. The same arithmetic is performed in region 2112 as in region 2106, described above. Specifically, each k'th input vector is multiplied by the positional weight function $w_x$ of the positional distance of the k'th pixel from the i'th pixel, and the resulting products are summed. A single output vector is produced, having the value $$\sum_k w_x(\vec{x_k} - \vec{x_i}) \cdot w_I(\vec{I_k} - \vec{I}_i^{mod}) \cdot \vec{I_k}$$

The vector output of region 2112 in the crosspoint array chip is provided to the "numerator" input of the hardware divider 2108. The divider 2108 can, for example, be made up of three (one for each element of the numerator vector) analog-to-digital convertors where its nominator is provided as the analog reference value input and the numerator as the analog data input value, followed by respective D/A convertors to return $\vec{I}_i^{mod}$ to analog form.

$\vec{I}_i^{mod}$ is provided to an analog memory 2114, where it is stored for the next iteration of the circuitry of FIG. 1. This circuitry iterates until $\vec{I}_i^{mod}$ converges, usually two to three iterations, and the result is stored in a strip buffer 1714 (FIG. 17). The circuitry of FIG. 21 is then operated again for the next pixel i, and so on.

Returning to FIG. 17, the output of sharpening filter 1712 is provided to a strip buffer 1714, which is then provided to the display 1716. As with control circuit 1510 (FIG. 15), the destination system in FIG. 17 also includes a control 1718 which may, for example, be the CPU of a personal computer.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A method for electronically transmitting image representations through limited-bandwidth communications channels comprising the steps of:

decimating a first array of image elements in two dimensions to form a decimated image array of a reducedelement-volume second array of decimated image elements by assigning to each image element in said second array a single value mapped from and related to a uniformly sized group of image elements in a plurality of such groups in said first decimated image array;

compressing the volume of data needed to represent said decimated image array by a predefined compression algorithm to form a compressed image representation;

transmitting said compressed image representation over a limited-bandwidth transmission medium to another location;

decompressing said transmitted compressed image representation with a predefined decompression algorithm that is the inverse of said predefined compression algorithm, to form a decompressed image array;

expanding said decompressed image array into an interpolated image array by mapping each image element in said decompressed image array to a group of image elements of said uniform size in said interpolated image array and interpolating each image element in each group according to a predefined interpolation function that substantially reverses the step of decimation and restores each image element in said interpolated image array to approximate its counterpart in said first array of image elements; and sharpening object edges represented in an interpolated image. included in said interpolated image array to form an output image array wherein each image element in said output image array is further improved overall to approximate its counterpart in said first array of image elements;

said step of sharpening comprises the step of replacing each $i^{th}$ element of said interpolated image array with a value given by a weight function $$I_i^{mod} = \frac{\sum_k w(\vec{x}_k - \vec{x}_i, \vec{I}_k - \vec{I}_i^{mod}) \cdot \vec{I}_k}{\sum_k w(\vec{x}_k - \vec{x}_i, \vec{I}_k - \vec{I}_i^{mod})}$$

where w is a weight function which decreases as $|\vec{x}_k - \vec{x}_i|$ increases and decreases as $|\vec{I}_k - \vec{I}_i|$ increases.

2. The method according to claim 1, wherein:

w( ) is separable in $\vec{x}$ and $\vec{I}$.

3. The method according to claim 1, wherein:

$w_I( ) = w_x(\vec{x}_k - \vec{x}_i) w_I(\vec{I}_k - \vec{I}_i)$ and $w_I(\vec{I}_k - \vec{I}_i) =$ $$\left\{ \begin{array}{l} 1 \text{ if } |\vec{I}_k - \vec{I}_i| < \text{threshold} \\ 0 \text{ if } |\vec{I}_k - \vec{I}_i| \geq \text{threshold} \end{array} \right\}.$$

4. A method for electronically transmitting image representations through limited-bandwidth communications channels comprising the steps of:

decimating a first array of image elements in two dimensions to form a decimated image array of a reduced-element-volume second array of decimated image elements by assigning to each image element in said second array a single value mapped from and related to a uniformly sized group of image elements in a plurality of such groups in said first decimated image array;

compressing the volume of data needed to represent said decimated image array by a predefined compression algorithm to form a compressed image representation;

transmitting said compressed image representation over a limited-bandwidth transmission medium to another location;

decompressing said transmitted compressed image representation with a predefined decompression algorithm that is the inverse of said predefined compression algorithm, to form a decompressed image array;

expanding said decompressed image array into an interpolated image array by mapping each image element in said decompressed image array to a group of image elements of said uniform size in said interpolated image array and interpolating each image element in each group according to a predefined interpolation function that substantially reverses the step of decimation and restores each image element in said interpolated image array to approximate its counterpart in said first array of image elements; and sharpening object edges represented in an interpolated image included in said interpolated image array to form an output image array wherein each image element in said output image array is further improved overall to approximate its counterpart in said first array of image elements;

forming an edge file identifying edges of said first image in terms of elements of said first image array, wherein said step of sharpening edges of said interpolated image comprises the step of applying a predefined sharpening function to edges of said interpolated image corresponding to those identified in said edge file.

5. The method according to claim 4, wherein:

said step of applying a predefined sharpening function comprises, for each given one of said edges of said interpolated image, said interpolated image array having R elements normal to said given edge in one direction and S elements normal to said given edge in a direction opposite said one direction, the steps of: replacing the value in each of said R elements with an average of the values in said R elements; and replacing the value in each of said S elements with an average of the values in said S elements.

6. The method according to claim 4, wherein:

said predefined compression algorithm compresses sub-arrays of said decimated image array separately from other sub-arrays of said decimated image array, further comprising the step of softening borders of sub-arrays in said interpolated image array corresponding to said sub-arrays of said decimated image array.

7. The method according to claim 6, wherein:

said predefined compression algorithm conforms to a JPEG standard, and said sub-arrays of said decimated image arrays are respective JPEG blocks.

8. The method according to claim 4, further comprising the step of:

transmitting said edge file over a transmission medium in correspondence with said compressed image representation.

* * * * *